Jan. 31, 1967   L. L. FLAUGHER ET AL   3,302,107
APPARATUS FOR TESTING AUTOMATIC TRANSMISSIONS
Filed Jan. 2, 1964   10 Sheets-Sheet 1

INVENTORS
LAWRENCE L. FLAUGHER
WILLIAM E. KELLER
JOHN R. MARTIN
BY Fidler, Bradley, Patnaude & Petherbridge
Attys.

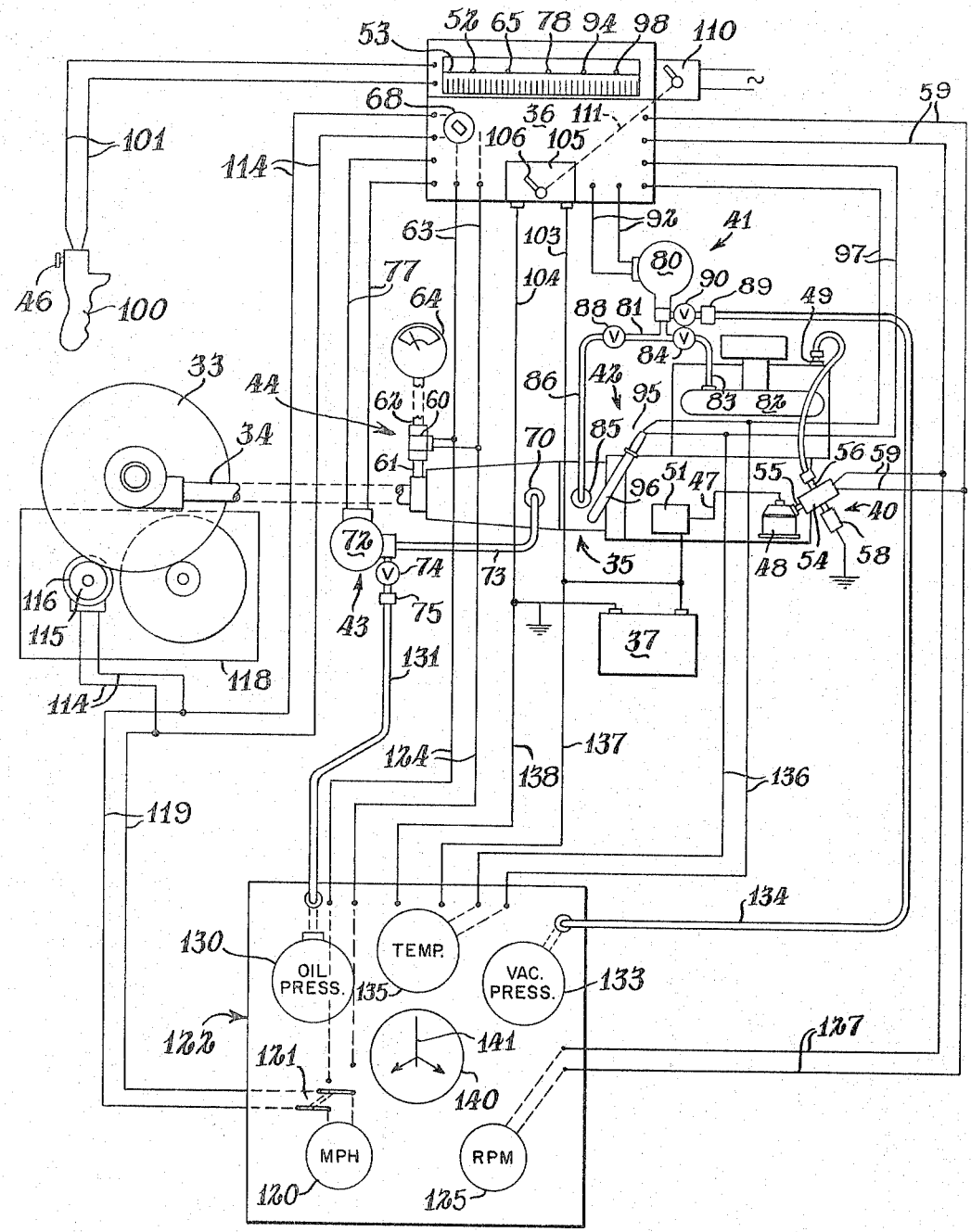

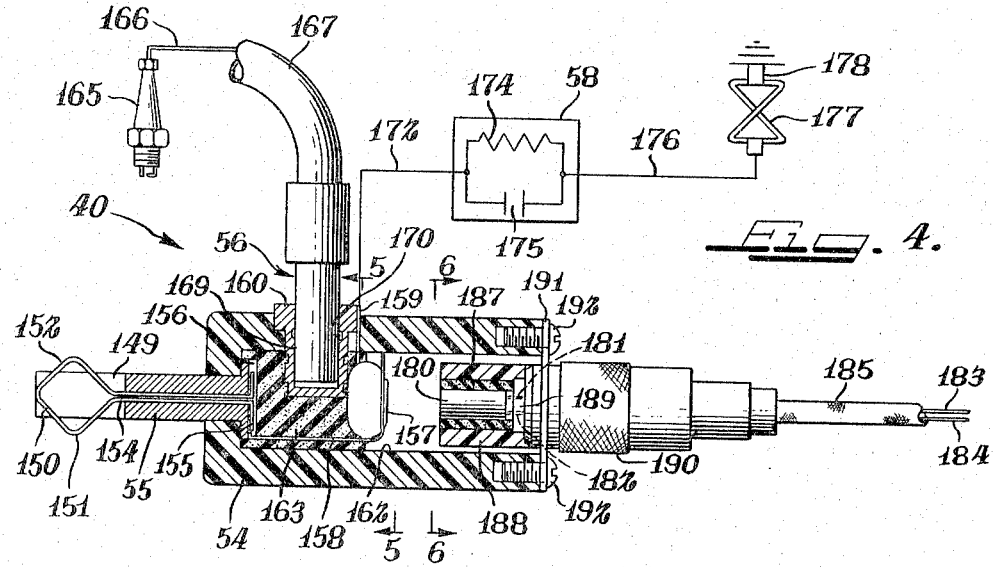
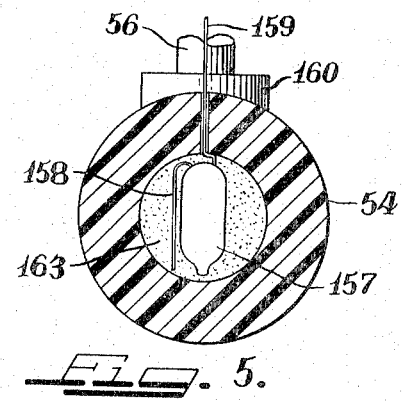
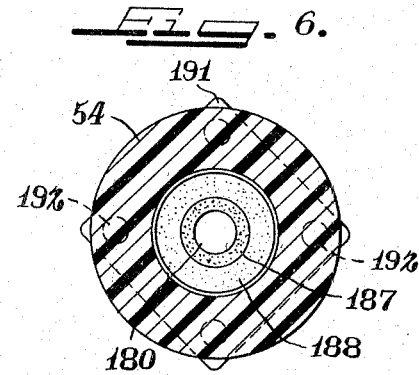
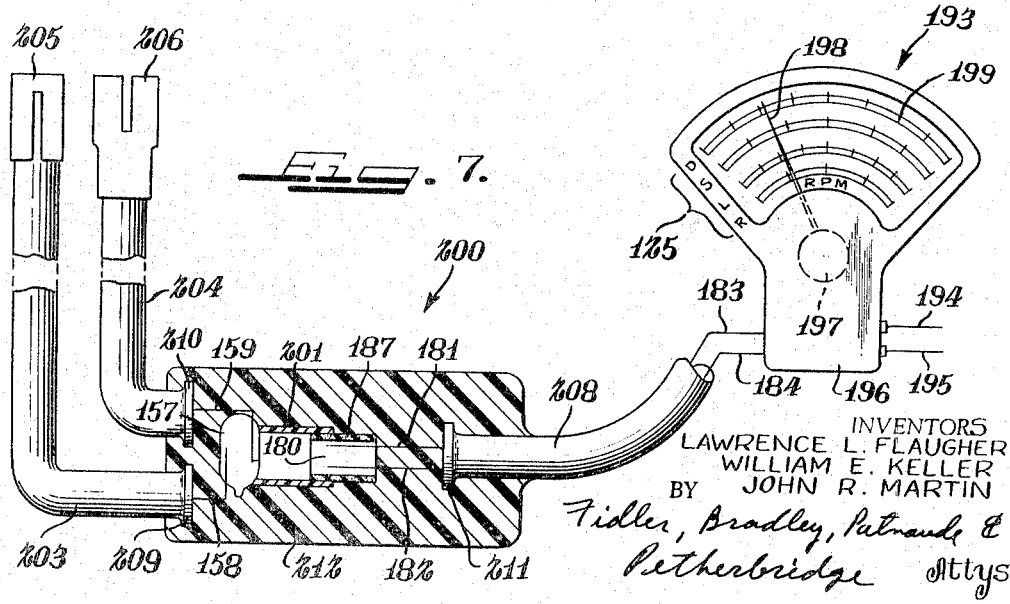

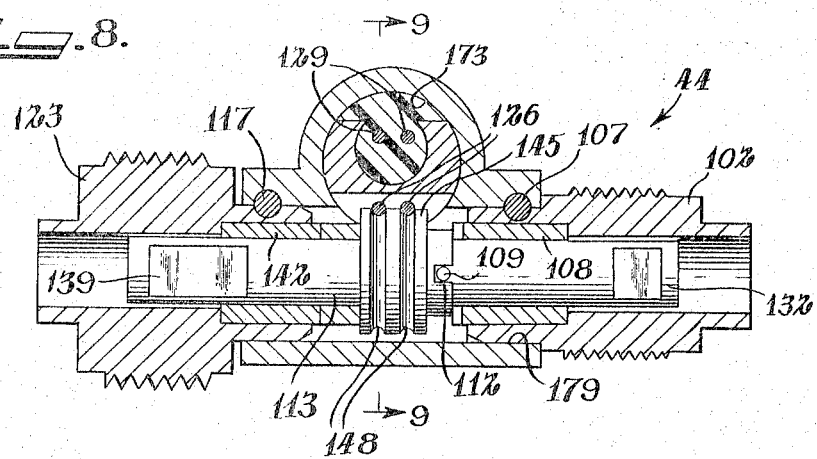
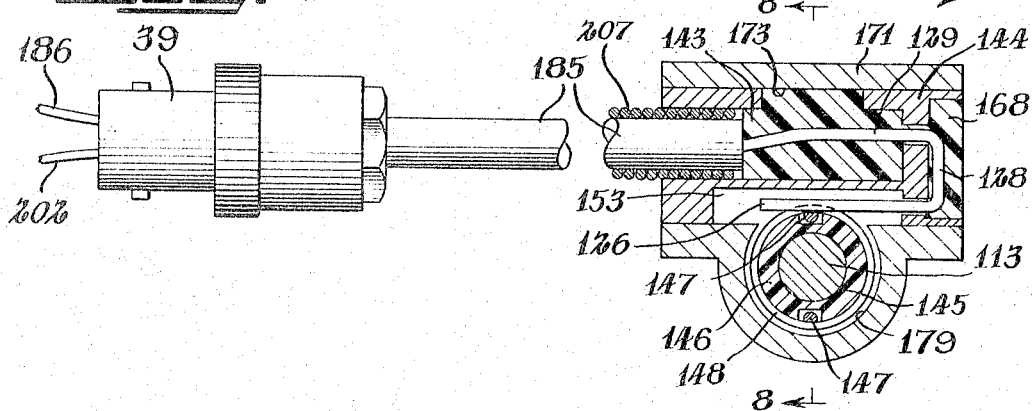
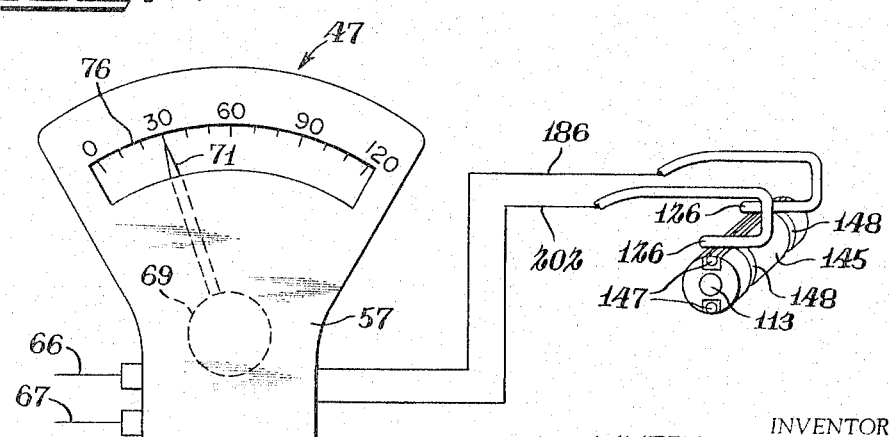

Jan. 31, 1967   L. L. FLAUGHER ET AL   3,302,107
APPARATUS FOR TESTING AUTOMATIC TRANSMISSIONS
Filed Jan. 2, 1964   10 Sheets-Sheet 5
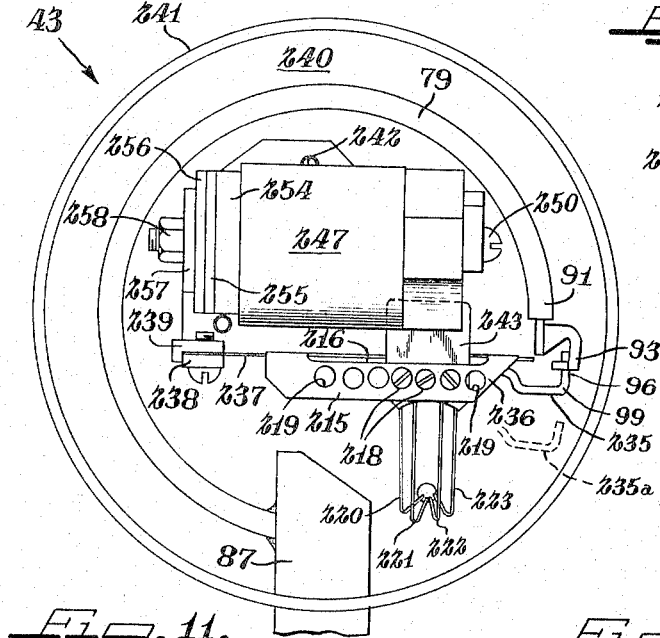
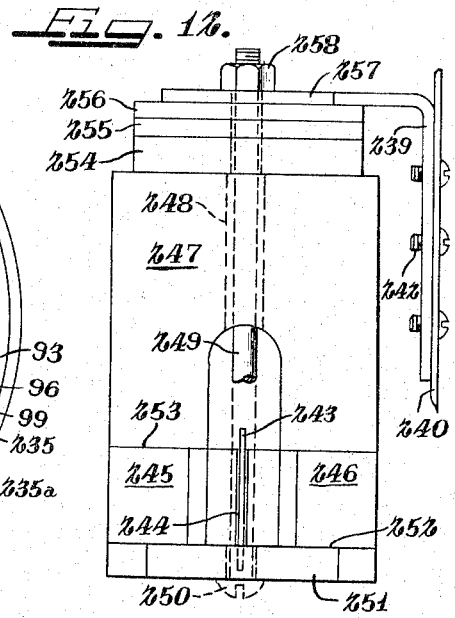
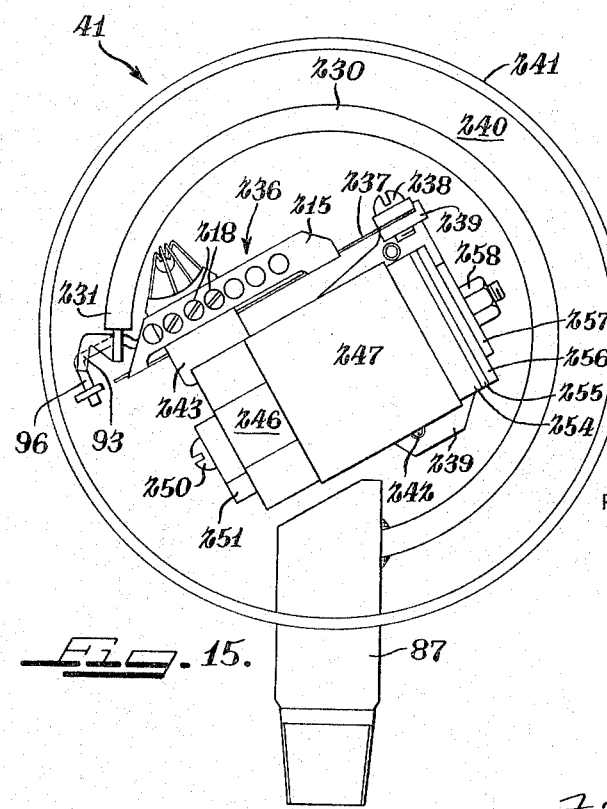
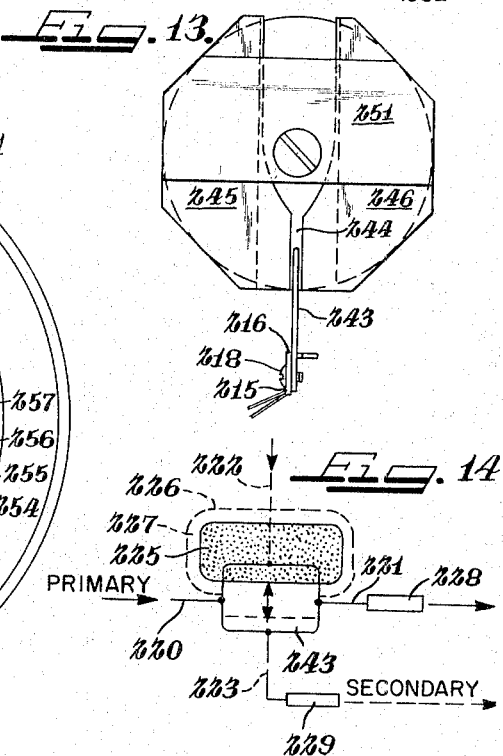
INVENTORS
LAWRENCE L. FLAUGHER
WILLIAM E. KELLER
JOHN R. MARTIN
BY Fidler, Bradley, Patnaude & Petherbridge   Attys

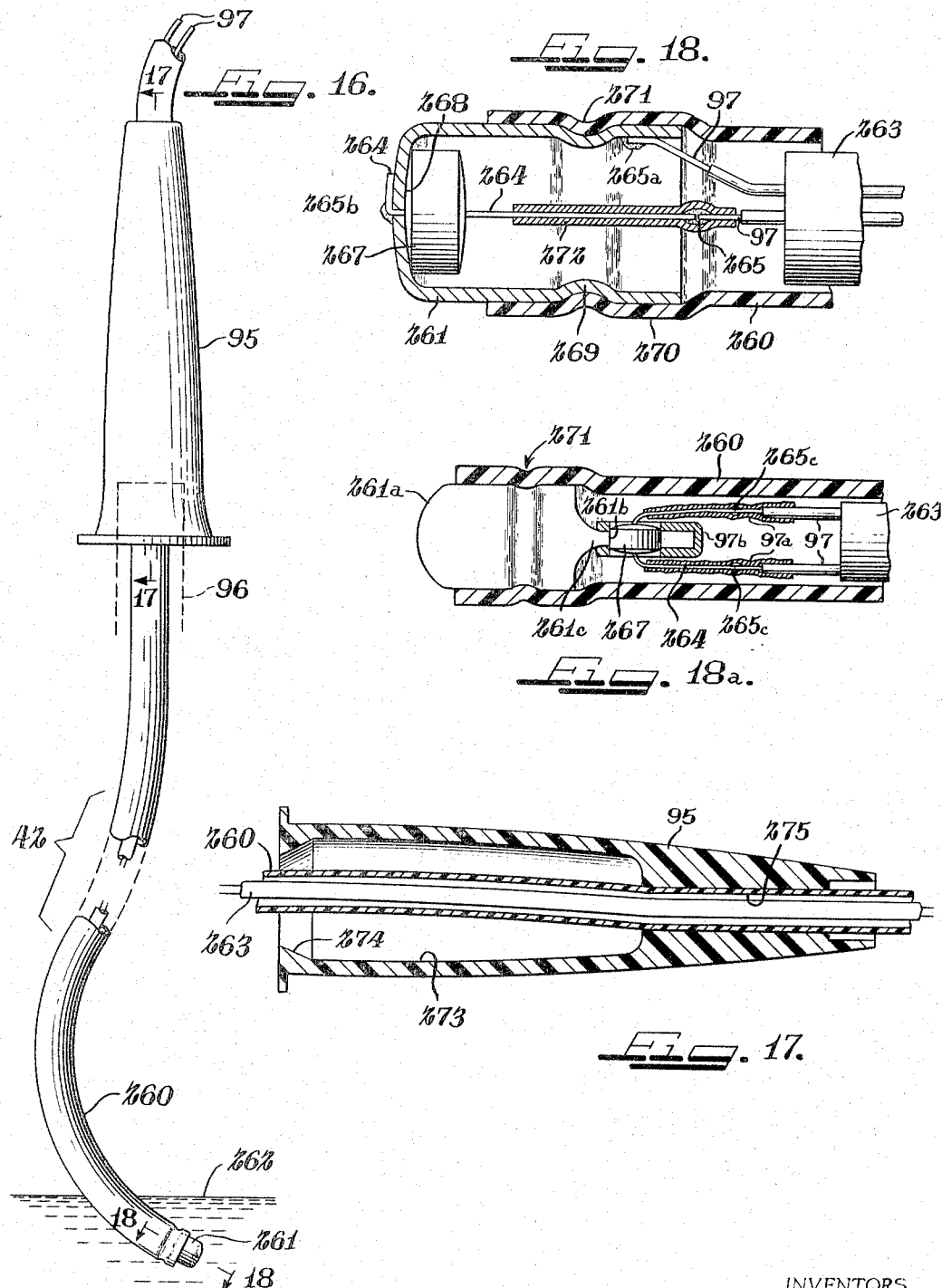

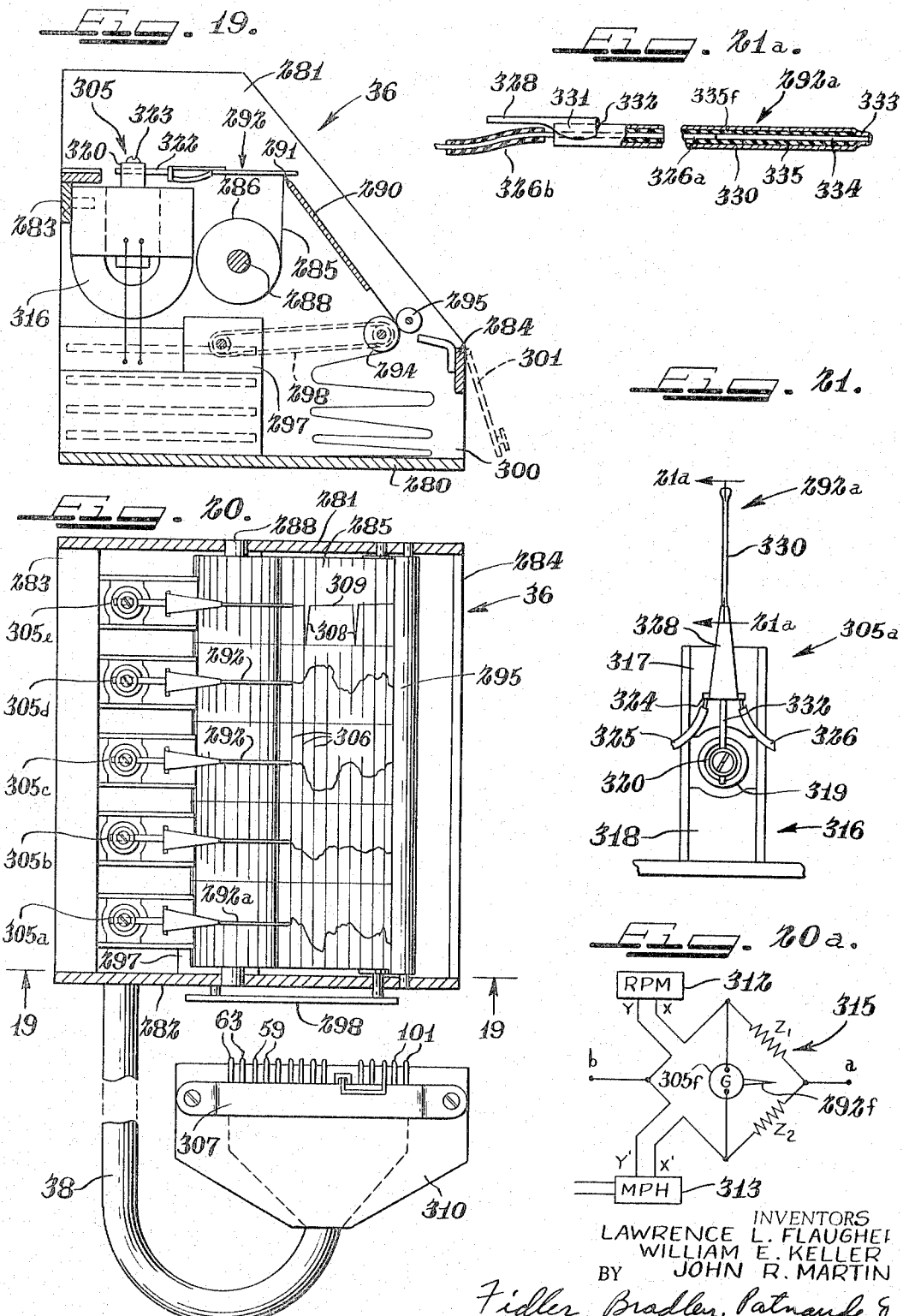

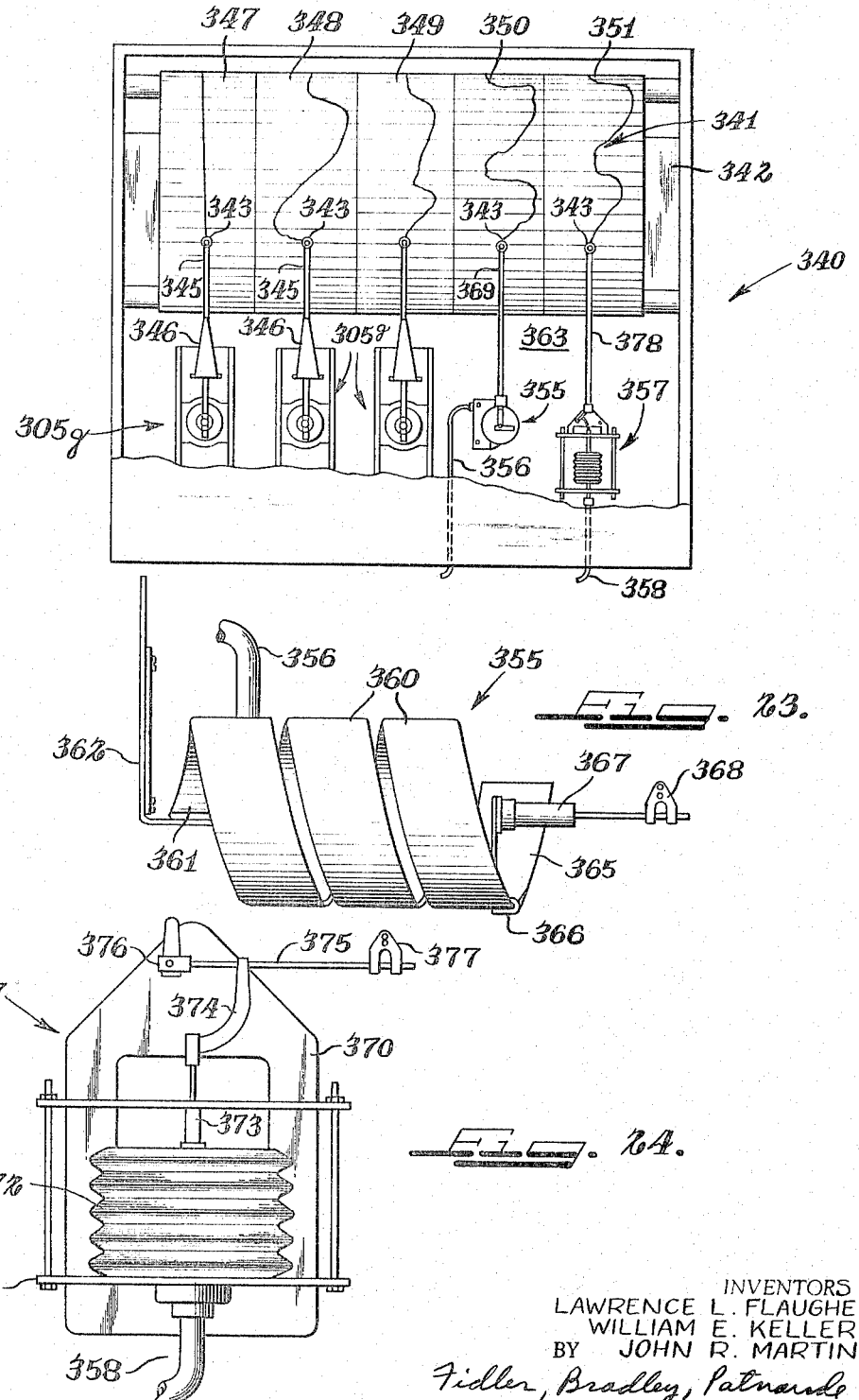

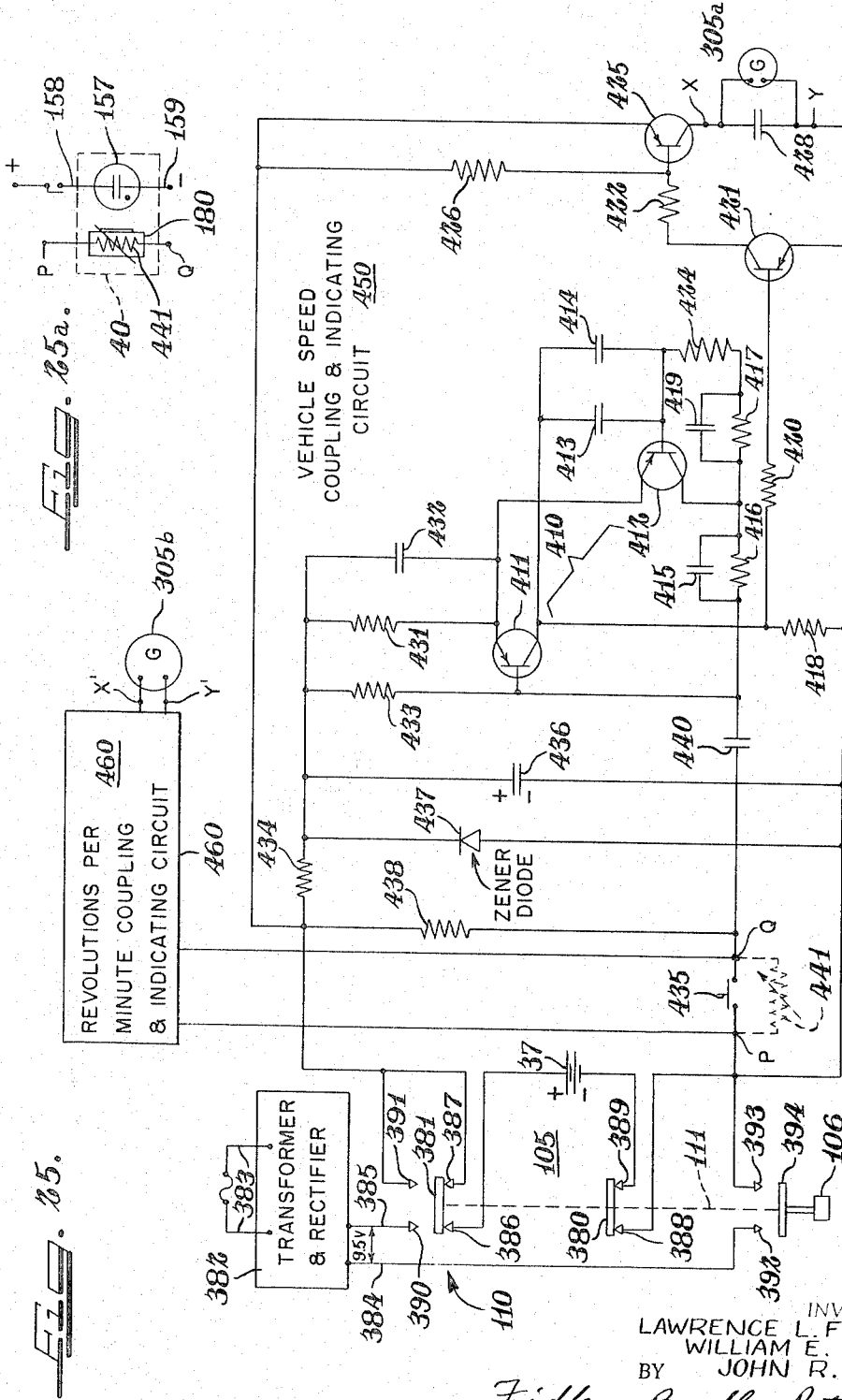

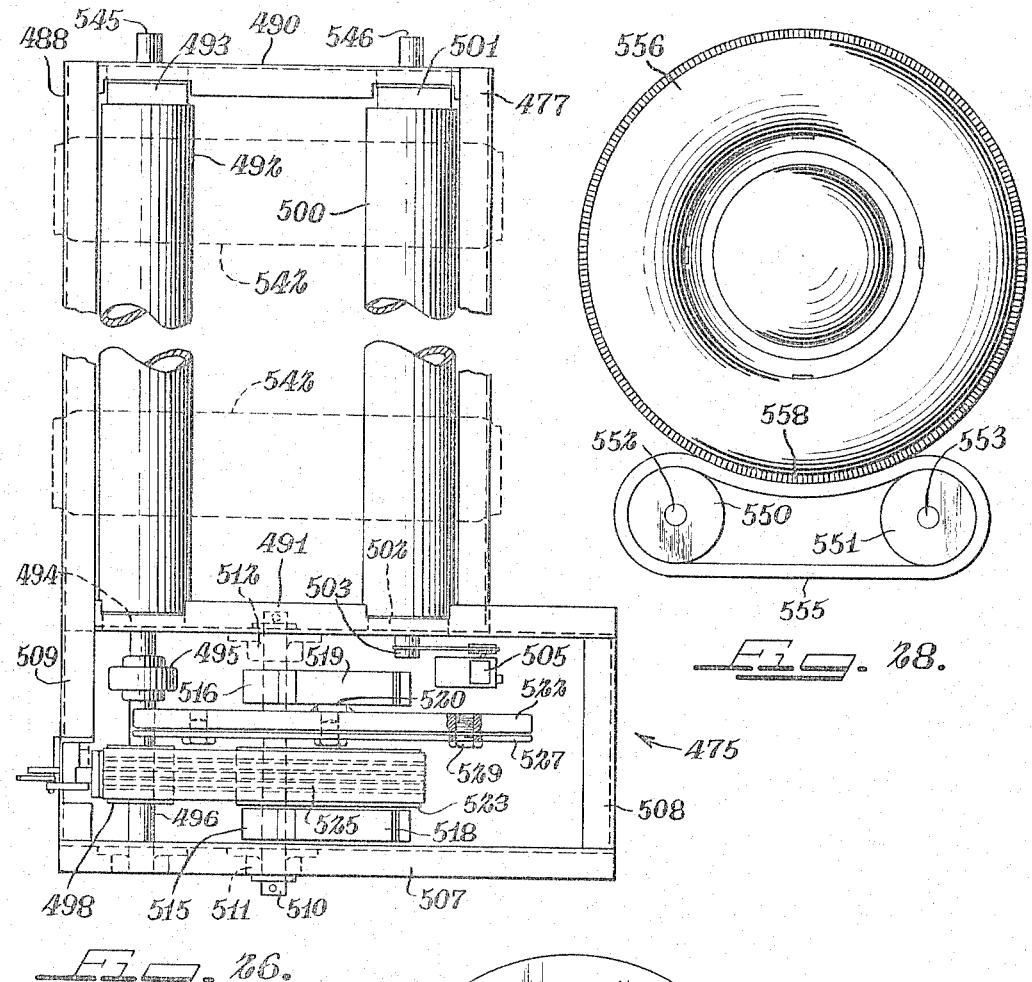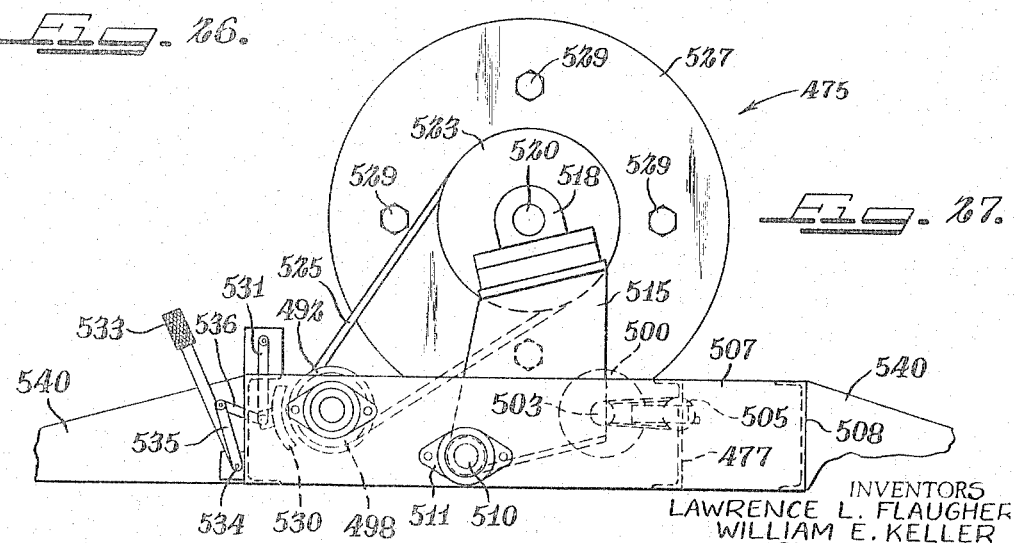

United States Patent Office 3,302,107
Patented Jan. 31, 1967

3,302,107
APPARATUS FOR TESTING AUTOMATIC
TRANSMISSIONS
Lawrence L. Flaugher, Pewaukee, and William E. Keller and John R. Martin, Milwaukee, Wis., assignors, by direct and mesne assignments, to Applied Power Industries, Inc., Milwaukee, Wis., a corporation of Wisconsin
Filed Jan. 2, 1964, Ser. No. 335,088
6 Claims. (Cl. 324—70)

The present invention relates broadly to testing engine powered automatic transmissions; and more particularly to function responsive testing mechanism for such automatic transmissions for use during road operation of a vehicle incorporating same and/or for use in combination with an improved inertia device, and in accordance with a predetermined test program for ascertaining characteristics of operations of the transmissions to display and/or record function intelligence.

This invention is related to that shown in the application of Lawrence L. Flaugher, entitled, "Machine and Method for Testing Automatic Transmissions," filed March 7, 1963, Serial No. 263,547, to which reference may be had. The present invention distinguishes from that of said application by being more particularly directed to mechanism having attributes usable with such system for responding to predetermined functions of transmissions. Such transmissions are from different sources of manufacture and frequently embody different modifications from a single source.

The present invention is characterized by having mechanism for responding to functions of a transmission in accordance with and for comparison to a pre-established program of functions and for giving indications of the functions at the time the functions occur, as well as making a permanent record of the functions; and is further characterized by incorporating electrical and/or mechanical means for causing indications and records to be established, which means do not inhibit the full performance of the functions.

The invention to be described more specifically hereinbelow includes a device connected to the ignition system of an internal combustion engine for ascertaining the speed of the engine and is so constructed and arranged that the device does not inhibit the performance of required operations of the ignition system. A device for indicating vehicle speed is constructed and arranged to be adapted into the speedometer system in such way that it will not inhibit operation of the speedometer.

For test stand speed indication, a tachometer is driven by the drive wheels of the vehicle; which tachometer may be associated with an inertial kinetic energy mechanism to be described below.

Pressure and vacuum pressure-electric transducers are associated with sources of hydraulic pressure in the transmission and vacuum of the engine air intake respectively in such manner as not to inhibit the performance of those portions of the transmission using this hydraulic pressure, or proper performance of the air intake system. The inertial kinetic energy storing and delivering mechanism is arranged to simulate to a predetermined extent the acceleration and deceleration of an automobile or the like, and is constructed and arranged to absorb energy of the engine through the transmission during short periods of acceleration, and further to deliver energy thus stored back through the transmission to the engine to simulate in substantial part the characteristics of acceleration and deceleration of a vehicle. Transmission oil temperature is also read and/or recorded readily in keeping with this invention.

In carrying out this invention, a predetermined program of normal functions of a transmission is ascertained by performing a series of tests upon several transmissions of a given kind. These characteristics are compared to the end that norms are established for each significant function of this transmission. A program of such norms is established including some or all of the functions that a transmission is capable of performing. Accordingly, new transmissions can be tested by the manufacturer by following a program while operating the transmission at the end of the transmission assembly line. Both new and used transmission can be tested in situ in vehicles. For particular details of mechanism and methods for establishing and carrying out such test programs, reference may be had to the above-mentioned application of Lawrence L. Flaugher.

In accordance with the present invention, function indicating mechanisms are co-ordinated in a new manner and include new components to display data and/or utter a record for comparison with the norms that have been pre-established.

It is an object of this invention to provide improved mechanism responsive to performance of an automatic transmission for displaying and/or recording such response.

It is a further object of this invention, in keeping with the preceding object, to provide adapter means for connecting displaying and/or recording means with mechanisms associated with an automatic transmission while not inhibiting a function of any part to which the adapters are connected.

It is a further object, in connection with the first object above, to provide an improved engine speed sensing means connected with the ignition system thereof without inhibiting the operation of the ignition system.

A further object of this invention is to provide an adapter for indicating vehicle speed connected in the speedometer system thereof without inhibiting operation of the speedometer.

A further object of this invention is to provide hydraulic pressure responsive means associated with a pressure in an automatic transmission without inhibiting the operation of parts by the hydraulic pressure.

A further object of the invention is to sense vacuum from the air intake to the engine without inhibiting the air intake thereto.

It is a further object of the invention to provide an electrically driven recorder that is remote from the transmission being tested, and supplying the recorder with sufficient electrical potential whereby to reduce the requirements for substantial amplication of function response signals for driving a galvanometer indicator or the like in the recorder.

It is a further object of the invention to provide means for dynamically loading a transmission under test conditions to receive kinetic energy from the engine under predetermined controlled conditions, and return kinetic energy through the transmission to the engine under other predetermined controlled conditions.

Other objects and advantages of the invention reside in details of construction and arrangement and co-operation of parts, and will be either obvious or pointed out in the specification and claims considered with respect to the accompanying drawings, in which:

FIG. 1 is a diagrammatic view of a vehicle conditioned for a road test;

FIG. 2 is a schematic diagram of the test equipment illustrated in FIG. 1;

FIG. 3 is a wiring diagram of the mechanism arranged for test stand operation;

FIG. 4 is a half-sectional view, partly diagrammatic, showing an engine r.p.m. indicator;

FIG. 5 is a sectional view taken on line 5—5 of FIG. 4;

FIG. 6 is a sectional view taken on line 6—6 of FIG. 4;

FIG. 7 is a half-sectional view, similar to FIG. 4, and showing a modification of the engine r.p.m. indicator;

FIG. 8 is a half-sectional view of a speedometer cable adapter for generating signals indicating vehicle speed and taken substantially on line 8—8 of FIG. 9;

FIG. 9 is a sectional view taken substantially along the line 9—9 of FIG. 8;

FIG. 10 is a diagrammatic view showing a speedometer operated by the speed indicator;

FIG. 11 is an elevational view, with the cover removed, of a pressure signal generator;

FIG. 12 is a plan view of the magnet structure shown in FIG. 11;

FIG. 13 is a projected end view of the magnet shown in FIG. 12;

FIG. 14 is a diagrammatic view showing the electrical signal generator operated by the pressure signal generator shown in FIGS. 11 and 15;

FIG. 15 is a view similar to FIG. 11 and showing a vacuum pressure signal generator;

FIG. 16 is a view of a probe for measuring the temperature of transmission oil;

FIG. 17 is a sectional view at an enlarged scale taken substantially along lines 17—17 of FIG. 16;

FIG. 18 is a sectional view at an enlarged scale taken along lines 18—18 of FIG. 16;

FIG. 18a is a sectional view similar to FIG. 18; but showing a modified construction;

FIG. 19 is a sectional view of a recorder, showing certain parts in elevation, and taken substantially along the lines 19—19 of FIG. 20;

FIG. 20 is a plan view of the recorder shown in FIG. 19;

FIG. 20a is a diagrammatic view showing a circuit used with the recorder of FIGS. 19 and 20;

FIG. 21 is an enlarged view of a galvanometer and stylus driven thereby;

FIG. 21a is an enlarged sectional view taken substantially along lines 21a—21a of FIG. 21;

FIG. 22 is an elevational view with the cover broken away showing a modification of the recorder mechanism;

FIG. 23 is a detailed view of a Bourdon tube shown in FIG. 22;

FIG. 24 is an enlarged detailed view of a vacuum sensitive device shown in FIG. 22;

FIG. 25a is a wiring diagram showing velocity coupling and indicating circuits;

FIG. 25 is a detailed wiring diagram of a modification of FIG. 25;

FIG. 26 is a plan view showing an inertia accumulating device of the invention;

FIG. 27 is a view of the inertia storing system shown in end elevation; and

FIG. 28 is a modification of the drive means for the inertia accumulating mechanism.

In practicing the present invention, and in accordance wth the disclosure of the above-mentioned application, the vehicle containing a transmission is usually brought in for service because of noticeable malfunctions or noises, or the like, which latter may or may not be caused by the transmission. In some cases, of course, the transmission is damaged to such an extent that the vehicle is inoperative and must be repaired at least in part before a test such as to be described below can be conducted.

With the vehicle in condition to drive, the same is either test stand operated or road tested where there are road facilities available for such purposes, or both. In metropolitan areas, however, such road facilities are usually not available and, accordingly, a test stand is used. With the vehicle upon the test stand, the same is adapted to drive a pair of rolls. At least one of the rolls drives an inertia device capable of receiving kinetic energy, storing same and returning energy to the drive wheels under coasting conditions.

It has been found through series of tests that a given transmission from a given source of manufacture will have a pattern of characteristics from which a series of norms can be established. For example, and as explained in detail in the above-mentioned appliaction, for a given engine r.p.m. related to a given vehicle speed, or output shaft r.p.m., with the range selector in a given range, the primary oil pressure in the transmission will follow a predetermined pattern when the transmission is operating properly. Individual transmissions of a given kind may vary somewhat within a range of norms in such a pattern; but it has been discovered that a transmission that operates satisfactorily under this predetermined condition is not at fault as regards functions related thereto. A series of test steps is carried out according to a predetermined program; and a graph, or the like, is recorded with automatic recording instrumentation to be described in detail below.

As additional transmissions of a given kind from a given source of manufacture are tested, more specific data is acquired and recorded to further more carefully define the norms for such transmission. Fleet operators, such as taxi cab companies and the like, can utilize such information favorably by conducting periodic tests on vehicles in use. It is possible to ascertain when a given kind of transmission is about to fail so that same may be repaired or replaced at a convenient time, rather than to have the equipment out of service at times when it is inconvenient or not economical to so do. In this manner, the invention comprises the feature of being able to ascertain deterioration of components of transmissions to foretell a time of probable failure; and such feature is unique to the machine and method disclosed in the above-mentioned application.

Referring now in detail to the invention and first to FIG. 1, an automobile generally indicated at 30 is shown under test and traveling on a road 31. The automobile 30 is conventionally powered with an internal combustion gasoline engine 32 for turning a drive wheel 33 through a drive shaft 34 and an automatic transmission generally indicated at 35. A recording instrument 36 is carried conveniently on the right-hand side of the front seat of the automobile 30. The recording instrument 36 is conveniently powered by a battery 37 through wires, not shown, in a cable 38 leading to the recording instrument 36.

Suitable electrical and/or pressure connections are made at different points in the power and transmission system for indicating performance functions to be pointed out more in detail below. These connections may also be at least in part in the cable 38 for convenience. A connection 40 may transfer pulses from the spark ignition system to the recorder to render an indication of engine r.p.m. A vacuum connection 41 may indicate functions of portions in the vacuum system of the automobile. A connection 42 may indicate the temperature of the oil in the automatic transmission 35. The connection 43 may indicate the pressure of primary oil, or other oil pressure, in the automatic transmission 35. A connection 44 may indicate vehicle speed and be connected in the speedometer system of the vehicle. A connection 45 may be connected into the cable 38 and be manually operated by a switch 46 to record the beginning or end of a given phase in the steps of test operation.

Referring now to FIG. 2, like characters of reference refer to similar parts and these are shown in still more detail than in FIG. 1. Hereinbelow still additional details of the different controls and the control systems associated therewith will be described. Referring first to the engine r.p.m., indicator 40, a distributor 48 is adapted to provide pulses for firing a spark plug 49 and is supplied with current from the battery 37 to a conductor 50 through a coil and condenser 51 and a distributor wire 47. A pulse signal generator 54 is plugged into the distributor 48 with a bayonet connection 55 similar to the spark plug connector 56, shown plugged into the side of the signal generator 54. A resistor and capacitor unit 58 is connected to ground and is adapted to fire the generator 54 even though the spark plug 49 is faulty, in a manner to be described more in detail below. Signals generated by the generator 54 are fed through wires 59 to the recorder 36 to drive a marking device 52 after suitable amplification in the amplifying system in the recorder 36, to be described in detail hereinbelow.

The distributor 48, in a four cycle engine, will deliver a spark pulse to the spark plug 49 every other revolution of the engine 32. With the engine rotating at 1800 r.p.m. there will be 900 pulses per minute, or 15 pulses per second. As will be described more in detail below, an integrating circuit is adapted to receive these pulses and integrate same in a direct current amplifier which will derive a signal as a function of engine r.p.m. to cause the marking device 52 to be positioned by a galvanometer or the like in accordance with the engine speed.

Referring now to the vehicle speed indicator 44, an adapter 60 is connected with a shaft 61 normally adapted to receive a shaft 62 for driving a speedometer 64. The shaft 61 turns a commutator which causes signals to be impressed in a pair of conductors 63 to supply pulses to the recording instrument 36. The commutator and associated mechanism will be described in further detail hereinbelow. In the recording instrument 36 the pulses are integrated in substantially the same manner and in a circuit similar to that of the engine r.p.m. signal generator 54 to drive a marking device 65 to place indicia on the chart 53 in the recording instrument 36. The changeover switch 68 adapted for test stand operation provides a method to check the accuracy of the speedometer during test stand operation and will be explained more in detail hereinbelow in connection with FIG. 3.

The primary oil pressure indicator 43 includes conventional tapped connection 70 in communication with a source of primary operating fluid pressure within the transmission. The connection 70 transmits oil pressure through a pipe 73 to an electric signal transducer 72. A valve 74 connected with a quick coupler 75 is also in communication with the fluid pressure of the pipe 73 for a purpose to be described hereinbelow. The signal generator 72 is adapted to generate a signal substantially linearly in accordance with the variations of pressure in the primary oil system in the transmission and transmit such signal through wires 77 for amplification in the amplifier in the recording instrument 36. The signal thereafter drives a pen 78 or the like to place indicia on the chart 53 responsive to the pressure variations. This function may also be accomplished with direct hydraulic connections in a manner to be pointed out more particularly hereinbelow with reference to FIGS. 22, 23 and 24.

The vacuum signal generator system 41 comprises an electric signal generator 80 responsive to pressure in a vacuum connection 81 in communication with the air intake manifold 82 of the engine through a tube 83 and a valve 84; or same may be in communication with a connection 85 to a vacuum modulated control within the transmission, if provided in the transmission, through a tube 86 and a valve 88. The vacuum pressure is also in communication with a quick connect coupling 89 controlled by a valve 90 for a direct reading purpose to be hereinafter more fully explained. The signals generated in the signal generator 80 are transmitted through wires 92 to the recording instrument 36, wherein they are amplified and cause a marking device 94 to utter a signal indicative of vacuum pressure on the chart 53. This function also can be accomplished by tube connections, if desired, and will be discussed further below.

The oil temperature indicating system 42 consists of an insertion type thermometer, only the handle 95 in the form of a flexible cup, of which is shown. The thermometer consists of a temperature responsive resistance at the end of a relatively long and flexible probe which extends down the transmission fill-pipe 96 into the sump and into the oil in the automatic transmission 35. The temperature of the oil will modify the resistance of the temperature responsive resistance to place a potential across wires 97 which in turn is connected in a conventional bridge circuit driving a galvanometer to position a pen 98 for recording temperature on the chart 53.

The switch 46 is mounted in a handle 100 for convenience of the operator and same can be operated by the thumb. It is preferred that the same be clipped to the dashboard or steering wheel by means, not shown, for convenience of the operator during a road test. The pressure of the switch 46 places the potential across wires 101 which may short circuit a galvanometer winding in the recording instrument to cause same to drive its marking device to a limit to render a pip on the chart. Inasmuch as the temperature marking device 98 shows the least deviation during all phases of the test, it is preferred that such pips be created by short circuiting its coil.

The recording device 36 is powered from the battery 37 by a suitable hot and ground wires 103 and 104, respectively. A connection box 105 may be mounted upon or within the box containing the recording device 36 and a switch 106 may be turned to the position shown for operation on battery current. As will be pointed out more fully hereinbelow, the recording device requires approximately 9½ volts constant D.C. potential and the ordinary 12 volt battery will supply such potential. The recording instrument 36 can also be used with a test stand and it is convenient in such operation to use an alternating current source supplied into a switch box 110 to the recording instrument 36 to effect changeover. The switch box 110 preferably contains a conventional transformer and rectifier for providing substantially 9.5 volts the same as the battery 37. It is prefered that an interconnecting mechanical and electrical linkage 111 or the like be provided so as to properly open one set of contacts when another is brought into use. Such use will be described more fully hereinbelow in connection with FIGS. 25 and 25a showing the circuitry used in the invention.

Refering now to FIG. 3, the upper portion of the drawing is substantially identical to that described in connection with the FIG. 2, and similar reference characters refer to similar parts. The switch 68 in communication with leads 63 from the vehicle speed indicator can be turned to an alternate position across wires 114 which receive the output of a wheel velocity responsive electric generator 115 driven by a roll 116 on a test stand 118. The roll 116 is driven through the drive shaft 34 and the drive wheel 33 of the automobile 30. With the switch 68 turned between connection with the wires 63 and 114, at a given engine r.p.m. the vehicle speed recorded in pen 65 and indicated by the speedometer 64 should be identical. This provides a convenient speedometer check in conjunction with a vehicle transmission check and further provides for proper calibration of the recording instrument 36 with regard to speedometer indications, which latter may be inaccurate. The wires 114 connect with wires 119 to operate the miles per hour indicator 120 which may be driven by a potentiometer or the like in known manner. A switch 121 in the panel 122 can be turned to an alternate position across wires 124 to also calibrate the instrumentation on the panelboard 122. This panelboard is preferably placed adjacent a test stand on the driver's side thereof so that indications may be apparent to the operator at all times.

The panel 122 contains an engine r.p.m. indicator 125 connected through wires 127 with the engine speed signal generator 40. An oil pressure indicator 130 may be a conventional Bourdon tube type pressure indicator in communication through a pipe 131 with the quick coupler 75 and thus in communication with the pressure of the primary fluid in the transmission 35. The vacuum pressure Bourdon tube type indicator 133 connects through a tube 134 to the quick coupler 89 of the vacuum indicating system 41. A temperature indicating dial 135 may be driven by a conventional bridge type circuit, not shown, and in communication through wires 136 with the temperature sensing probe 42. The panel 122 may receive electric power from the battery 37 by hot and ground wires 137 and 138, respectively; or the electric portions of the system may be supplied with available transformed and rectified alternating power, if desired. An alternating current operated clock 140 equipped with a second hand 141 is provided for timing the operation of the several portions of a test program that may be performed.

Operation

A typical test program for a given transmission has been set forth in the above-mentioned application and will not be repeated. Reference may be had to said application, if necessary. Herein a brief resume will be given with reference first to FIGS. 1 and 2.

The recording instrument 36 is placed in the automobile and the cable 38, or other suitable connecting means, are used to connect same to the parts of the vehicle which render indications of functions that are useful for ascertaining the characteristics of operation of the transmission. It is to be understood that prior to arriving at this stage in a test of a transmission that each of many conventional steps has been performed such as checking the transmission oil for odors indicative of burnt parts or oil deterioration. The oil is checked for the presence of deleterious materials and the radiators are checked to indicate the presence of oil in the coolant indicative of leaks in the oil cooling system. The transmission is inspected, the seals and the like checked, and other necessary steps taken in well known manner.

The vehicle is then operated on a suitable road so that same can be caused to bring every part of the transmission into operation one or more times in accordance with a predetermined program of steps of operation. Each gear range is used at different points in the operation and the function of the transmission during acceleration and deceleration in the several ranges is recorded by the recording instrument 36.

A program of norms is established, as mentioned briefly above, and the indicia thereof may appear on a given chart or a master chart may be referred to and compared thereof. It is found that a mechanic can quickly learn to apply these norms and compare a given test therewith. It has been found that certain malfunctions present deviations from these norms under certain conditions that the indicative of malfunctions of certain of the components of the transmission. In the event the indication is only marginal adjacent parameters of the norms certain portions of the test can conveniently be repeated before the equipment is disconnected from the transmission.

By following the procedure described in detail in the foregoing application, a mechanic of nominal experience can usually discover the malfunctioning part and recommend correction thereof without the necessity of removing functioning parts of the transmission for inspection. Such dismantling is undesirable because of the length of time required thus tending to render servicing costs excessive. It has been found that certain tests may be conducted in a short period of time and several cars are serviced with a single recording instrument 36 in a period of a day.

With the vehicle on the test stand as indicated in FIG. 3, the operator has the additional advantage of the display of certain characteristics of operation by reference to the control panel 122. While the deviation of the sensor marking devices or pens are observable in the recorder in the position shown in FIG. 1, it is not convenient for the vehicle operator to make visual observations. However, such observations can be made by another person who may ride with the vehicle operator and note the deviations of the marking devices in the recorder 36.

With the test stand operation, there is no need for the operator to steer the vehicle and it is possible to operate each of the other controls without observing traffic or road conditions as is the case in road testing. For this reason, the test stand operations are more facile and conductive to discovery of characteristics of transmission function in a shorter period of time. It has been found that as many as three or four transmissions per hour can be tested by the test stand operation.

R.p.m. indicating mechanism

Referring now to FIGS. 4, 5 and 6, the ignition device for indicating engine speed is shown. The bayonet 55 at the left side of FIG. 4 has a cross slotted end 149 in which a spring wire connector 150 is located. The wire 150 has side bights 151 and 152, adapted to spring into a suitable groove, not shown, in the distributor cap in the same manner as the spark plug connector snaps into same inconventional practice. The connector 150 is secured in the bayonet 55 which may be of a suitable material. The legs 154 terminate in oppositely directed ends 155 in a cross groove 156 in the internal head of the bayonet 55.

A neon tube 157 has a lead wire 158 that is suitably soldered, not shown, to the down-turned end 155 of the connector 150. A second lead wire 159 from the neon tube 157 is suitably soldered to a cup 160. The entire end structure is secured within the left-hand end of a bore 162 in the housing of the ignition pickup 54 by a suitable potting plastic 163 substantially in the position shown. A spark plug 165 has a conductor 166 within conventional insulation 167. The conductor 166 is a conventional spark plug wire ending in a plug 169 which plugs into a cup 160 to conduct spark pulses to the spark plug 165.

The portion of the spark ignition responsive engine speed indicator above described receives spark pulses at the connector 150 from a suitable contact within the distributor, not shown, for distributing pulses to the several spark plugs to a four-stroke cycle engine. As will be obvious, the device could respond to the pulses of a two-stroke cycle engine, but in such instance there will be twice as many pulses indicating engine r.p.m. as in the case of the four-stroke cycle. The pulses are fed through legs 154, the end 155, the wire 158 which terminates internally of the neon tube 157 to cause an electron flow through the neon tube 157 to the wire 159, to the cup 160, the connector 169 and the wire 166 to the insulated terminal of the spark plug and strike an arc across the gas gap therein to ground in conventional manner.

To insure that the neon tube 157 fires to emit a light, a wire 172 may be connected to the wire 159 and to the ignition by-pass device 58. Within this device 58 there is a resistance 174 and a capacitance 175. The respective resistive values of each are substantially 100 megohms for the resistance 174, and 500 microfarads for the capacitance 175. Both are connected at their other ends from the connection to the wire 172 to a wire 176 which in turn is connected to a spring clip 177 that may be connected to the ground battery terminal 178 or other suitable grounded portions of the vehicle. Accordingly, even though there may be a break in the spark plug wire 166, or excessive gap between the points thereof to prevent plug arcing, the neon tube 157 can still fire through the above traced circuit to ground 178. Because of the substantial resistivity or impedance of the device 58 the normal function of the spark plug 165 is not inhibited.

Light from the neon tube 157 enters the end of a photocell 180 to reduce its resistance to cause an abrupt change in voltage between wires 181 and 182 suitably connected with wires 183 and 184 and a cable 185 with leads to the indicating and recording mechanism to be described more fully hereinbelow. The signals are transmitted through wires 183 and 184, accordingly, with respect to the occurrence of spark pulses in a given period of time. As will appear more fully below, the duration of an individual pulse is not significant; because the frequency of occurrence thereof only is utilized. It is to be understood, further, that the wires 183 and 184 could lead to a suitably adapted tachometer, if desired, to indicate engine r.p.m. to the vehicle operator. Such utilization of the mechanism will be described more in detail below in connection with FIG. 7.

The photocell 180 is preferably surrounded by a sponge rubber sleeve 187 which in turn is potted in a suitable plastic 188, in turn secured to a shoulder 189 of a connector 190. The connector 190 is secured to a plate 191 fastened by screws 192 to the open end of the housing 54. It is preferred that this be a substantially air-tight securement to prevent dust or foreign materials from being introduced into the space defined by the bore 162 in the housing 54. Because the device is used adjacent relatively warm engine parts, the air entrapped within the housing 54 is heated when in use and cool when not in use, thus tending to cause breathing of air in and out around any openings that may exist. A suitable flexible gasket, not shown, can be applied beneath the plate 191 and its point of abutment adjacent the open end of the housing 54, if desired, to resiliently expand and contract to prevent such breathing.

Referring to FIG. 7, a modification of the device is shown for receiving spark pulses and uttering signals in response thereto. Reference characters similar to those used above and indicating similar parts are repeated in connection with FIG. 7. A spark pick-up device 200 includes a sub-assembly comprising a neon tube 157 having leads 158 and 159 and a photocell 180 having leads 181 and 182, the photocell 180 being secured in a foam rubber tube 187. The face of the neon tube 157 and the foam rubber tube 187 are suitably cemented in a tube 201 to form a sub-assembly with tube 157 and the photocell 180 in proper juxtaposition. The leads 158 and 159 are suitably secured as by soldering to wires in leads 203 and 204 terminating respectively in a plug 205 for plugging into the distributor cap and a clip 206 adapted to snap over a terminal of a spark plug. Neither of the connections for the members 205 and 206 have been shown. The leads 181 and 182 of the photoelectric cell 180 are soldered to leads 184 and 183 contained within a cable 208. The cables 203, 204 and 208 are each shown as terminating in button heads 209, 210 and 211, respectively. These parts may be laid in suitable supports and in potting compound and a suitable plastic 212 can be secured around the same to complete the assembly substantially as shown.

This device shown in FIG. 7 is used in substantially the same manner as that disclosed above in connection with FIGS. 4, 5 and 6. The spark pulses will cause the neon tube 157 to flash and thereby activate the photoelectric cell 180 to render same conducting to pass a signal each time a spark pulse exists. These pulses may be assured by the device 58, not shown, in connection with FIG. 7. For rendering a long time test where there appears to be slippage in the transmission, for example, between the input shaft of an automatic transmission and the output shaft thereof, it is desirable to install in or on the dashboard in view of a vehicle operator a suitable device for viewing operation at different times of operation over a period of time. A tachometer indicator 193 can be supplied for mounting on a dashboard and may be supplied with battery current through lead wires 194 and 195 for activating a pulse receiving and integrating circuit, within the casing 196 of the tachometer 193. The circuitry thereof can be of a kind to be described hereinafter, or of other suitable kind, to operate a galvanometer 197 or the like to move an indicating needle 198 with respect to a scale 199 to indicate engine speed. The wires 183 and 184 will transmit pulses as the photocell 180 is rendered conducting by the presence of light from the neon tube 157.

Hence, another use for the spark pulse pickup mechanisms for indicating engine speed is as a direct reading portable engine tachometer; and such use is within keeping of the spirit and teaching of this invention. Presently used high powered small vehicles are normally equipped with an engine speed tachometer. This invention affords a very precise electronic tachometer of a kind which is instantaneously responsive and uninhibited by inertia of operating and connecting tachometer parts. This attribute of the invention is considered to represent further advantage of the present mechanism.

*Speed indicating mechanism*

Referring now to FIGS. 8, 9 and 10, a device for connecting into the speedometer cable and indicating and recording vehicle speed is disclosed. An adapter 102 is designed to connect into a connector provided on the transmission case to engage shaft 132 with the rotating shaft output of gearing on the drive shaft 34 of the vehicle in known manner and thus rotate shaft 132 therein in accordance with the speed of the drive shaft. The specific connections of the shaft 132 to the rotating output shaft have not been shown because there are certain minor differences in vehicles of different makes. Accordingly, it is to be noted that different adapters reside within the scope of the invention and slight modifications in the shaft 132 and the adapter 102 can be made, inasmuch as the same can be removed by withdrawing a cross pin 107 and removing the shaft and the adapter 102 and the bearing 108 associated therewith. A pin 109 is fitted into the shaft 132 and mates in a kerf 112 in the head of a second shaft 113 which has flattened ends 139 to receive a speedometer cable, not shown, adapted to rotate the speedometer in the driver's compartment of the vehicle. This end 139 of the shaft 113 may also be somewhat different in design and a removable pin 117 is associated with a connecting bushing 123, the shaft 113 and a bearing 142 associated with the assembly.

In each of the assemblies for all makes of vehicles a commutator 145 is attached to the end of the shaft 113. With specific reference to FIG. 9, the commutator 145 includes a hard plastic sleeve 146 in which axially parallel conducting strips 147 are secured, there being two shown 180 degrees spaced from each other. A pair of spaced-apart grooves 148 are formed in the circumference of the commutator 145 and partially in the conducting strips 147. A pair of contact wires 126 contact the conducting strips 147 twice in each complete revolution of the shaft 113 to cause a current flow thereacross between the wires 126.

Each of the wires 126 is formed with a return bend 128 and a return portion 129 embedded in a plastic block 143. The plastic block is, in turn, embedded in a cylinder sleeve 144 having a bottom recess 128 in which the ends of the contacts 126 are spaced and free to move to maintain contact with relatively light pressure to reduce wear with the commutator grooves 148 and the conducting strips 147 therein. The cylinder section is potted upon assembly at its end 168 by suitable sealing plastic and the entire structure of the cylindrical member 144 is placed within and sealed into a housing 171 having axially off-set bores 173 and 179 at right angles to each other. The bore 179 provides clearance for the commutator 145, whereas the bore 173 secures the conductive parts of the vehicle speed pickup in the position shown.

The wires 129 are suitably connected in a cable 185 with wires 186 and 202 leading to amplifying mechanism and recording device for making a record of vehicle speed. The cable 185 is preferably protected by a spring 207 secured by the compound 143 inside of the cylindrical member 144. The cable 185 may be secured to any suitable connector device 39 to support the wires 186 and 202. It is to be understood that in a vehicle there can be substantial movement of the pickup device because it is associated with the engine drive shaft. Accordingly, this construction described above is extremely rugged and adapted for use over long periods of time during use without deterioration or wearing out of parts of the commutator and associated contacts 126.

As referred to above in connection with FIG. 7, the speed responsive device can be used for other purposes than making remote indications and recordings. For example, and not in a limiting sense, the wires 186 and 202 could lead to a speedometer 47 mounted in the dashboard of a vehicle and supplied with current from the battery through leads 66 and 67. A suitable amplifier, not shown, in the housing 57 of the speedometer 47 can provide integrated current for driving a galvanometer 69 to position a needle 71 across a scale 76 to indicate vehicle speed. The amplifier within the housing 57 can conveniently be of the kind to be described more in detail hereinbelow.

The commutator 145 having conducting strips 147 is rotated by the vehicle drive shaft through suitable gearing, not shown. In the position shown in FIG. 10, the contacts 126 are shunted by the upper conductor 147 and accordingly current will flow in lines 186 and 202. As mentioned above, current will be caused to flow twice through these wires 186 and 202 in each revolution of the commutator 145. If the same is in 1–1 gear ratio with the drive shaft of the vehicle there will be two pulses appearing in the wires 186 and 202 for each revolution of the vehicle drive shaft. It is to be understood that more or less conductors 147 can be supplied conveniently in a commutator 145 and, accordingly, more or less pulses can be attained. Where the shaft is very slow turning it is preferred that more than one conductor 147 be employed for the commutator 145; and for high speed shafts it is preferred that only one be employed. The integrating circuit for receiving and transposing the pulses into indications suitable for galvanometric recording will be explained more fully below.

*Pressure indicating mechanism*

Referring now to FIGS. 11, 12 and 13, the pressure indicating mechanism 43 is illustrated. The mechanism 43 comprises a Bourdon tube 79 secured at one end to a post 87 which in turn connects to a tube 73, FIGS. 2 and 3. The tube 73, as pointed out above, is connected to the fluid system within the transmission, and in most instances is connected with a source of high pressure oil from the front pump of the transmission, and same is referred to as primary pressure. As the primary pressure increases, the cross-section configuration of the Bourdon tube 79 is changed in well known manner to cause a distal end 91 thereof to distend upward as shown in substantially a linear motion. As the pressure within the tube 79 decreases, the distal end 91 will retract downwardly. The distal end 91 is provided with a hook 93 which snaps into a hole 96 in the distal end 99 of an arm 235 attached to an angle bracket 236. A spring 237 is suitably fastened to the bracket as by soldering, not shown, and the spring is preferably of such bias that the end 235 normally fastened to the bracket 236 will occupy the dotted line position 235A when the connection between the hook 93 and end 96 is not made. The other end of the spring 237 is secured between a block 238 to an end of a bracket 239 in turn secured to the back wall 240 of the casing 241 containing the pressure indicator as by screws 242. With this arrangement of parts as the hook end 93 is raised a sensitive element 243 is moved into an air gap 244, FIG. 12, between pole pieces 245 and 246 fastened to north and south poles respectively of a magnet 247.

The magnet 247 is formed with an axial hole 248 therethrough and through which a brass bolt 249 is passed. The bolt 249 has a head 250 abutting a brass cross piece 251 which engages pole pieces 245 and 246 on a surface 252. The pole pieces 245 and 246 in turn engage flattened poles of the magnet 247 along a line 253. The bolt 249 further passes through suitable nonmagnetic spacers 254, 255 and 256 and the end 257 of the bracket 239. The parts are all secured together upon the bolt 249 by suitable lock nut 258.

Referring particularly to FIG. 13, it is to be noted that the air gap 244 is of a particular shape defined by the lower ends of pole pieces 245 and 246. The gap is preferably only a few thousandths of an inch over thirty thousandths of an inch inasmuch as the signal generating element 243 is substantially thirty thousandths (plus or minus two thousandths) of an inch thick. The particular element used is a product of Ohio Semiconductors Company and comprises a thin wafer of indium antimonide, or material having similar phenomena, which has the characteristic of diverting more or less electrons from a primary path to a secondary path in response to the presence of more or less magnetic flux normal to the flat sides of and passing through the element.

The exact positioning of the element 243 within the gap 244 is critical within certain limits and accordingly the bracket 236 includes a downturned edge 215 having a slot 216 through which the element 243 can pass and be positioned properly in the air gap 244. With the element 243 in this position, suitable cement such as glyptol 218, for example, is applied into hole 219 and in contact with the element 243 to secure same in the desired position. The elements have four flexible lead wires 220, 221, 222 and 223. The lead wires 220 and 221 may be considered primary and are supplied with a suitable current and the lead wires 222 and 223 may be considered as secondary and will generate variable signals depending upon the position of the indium antimonide element 243 in the gap 244 wherein it will intercept different quantities of magnetic flux.

Referring now to FIG. 14, a useful flux field 225 existing between the pole pieces 245 and 246 in the gap 244 is indicated within the solid line. A penumbra flux field 226 will also exist but its presence is of relatively little efficacy and is present in its lower area 227 as shown for substantially all positions of the sensitive element 243 within the gap 244. At the position of the element 243 with respect to the flux field 225 in FIG. 14, the element 243 can be moved only slightly downwardly from the position shown before becoming ineffective; but the element 243 can move substantially upwardly to intercept more flux lines in the field 225 in the gap 244. As more flux is intercepted, there is an effective intercept of more kilogauss and accordingly a greater current will be impressed across the secondary wires 222 and 223 which in turn may operate suitable amplifying electrical apparatus to generate a signal which can be utilized either by a galvanometer type recorder or potentiometer type, or other suitable recording and/or indicating means.

The indium antimonide element 243 has an inherent negative temperature coefficient. In other words, as the temperature increases from substantially zero degrees centigrade to 100 degrees centigrade the effective output voltage for a representative indium antimonite sample will decrease from approximately forty millivolts to less than half that value. Because it is desired to use the test equipment of the present invention in several ambient temperatures (even below zero degrees centigrade but usually less than plus forty degrees centigrade maximum) it is desirable to compensate the circuits for temperature responsive resistance changes in the indium antimonide as by applying suitable cupro-nickel positive temperature coefficient elements 228 and 229 in the primary and secondary circuits suitably sized and adapted to at least in large measure offset the resistance change due to various changes in the temperature affecting the sensitive element 243. Of course, it is to be understood that suitable constant temperature environment can be supplied, such as by providing heated air through suitable thermostatically controlled heaters or the like.

In operation, assuming a pressure rise in the Bourdon tube 79, the hook 93 attached to the Bourdon tube 91 will be raised. Accordingly, the sensitive element 243 will be moved upwardly between the pole pieces 245 and 246 and will intercept more lines of flux 225. Accordingly, more secondary current will be impressed because of divergence of electrons downwardly due to increased magnetic flux interception, and more current will appear in the secondary. Accordingly, amplifying equipment, not shown, will be impressed with higher current and indicate a higher pressure therefor. As the sensitive element 243 is moved downwardly, there will be less divergence of electrons to the secondary and accordingly a lower signal passed to the amplifying means.

It is to be noted particularly that the mass of parts moved in this instrument is very low. Accordingly, the Bourdon tube 79 is inhibited very slightly by such mass and is found to respond substantially instantaneously to variations in pressure in the tube 73 connected to the primary pressure in the automatic transmission 35. As noted in the above-mentioned Flaugher application, the pressure variations can be from only a few p.s.i. up to substantially 300 p.s.i. Accordingly, the Bourdon tube 79 is made of relatively rugged heavy gauge tubing to withstand pressures in this range. For this additional reason, it is preferred that there be a uniform bias placed upon the distal end 91 of the tube as by the slight bias provided by the spring 237 in its coupled position. Accordingly, the hysteresis in the metal 79 is unidirectional substantially at all times and even at very low primary fluid pressures, and this is an added attribute of this invention.

Referring now to FIG. 15, the vacuum pressure indicator 41 is illustrated. A Bourdon tube 230 is of relatively light gauge tubing to be sensitive and having a minimum of hysteresis in the vacuum range pressures. The other parts of the vacuum gauge 41 are substantially identical to those described in connection with the primary pressure gauge 43 described immediately above. Accordingly, the parts bear the same reference characters and the explanation thereof will not be repeated. It is to be noted herein, however, that the spring 237 biases the distal end 231 of the Bourdon tube 230 in an upward direction to maintain metal hysteresis therein at all times in a single sense and not attaining zero at any time. Accordingly, this instrument is particularly sensitive to variations in vacuum pressure. It is to be noted that as the pressure decreases in the Bourdon tube 230 the end 231 will be moved downwardly and to the right to move the indium antimonide sensitive element 243 into the air gap between the pole pieces attached to the magnet 247 substantially identically to the movement described above in connection with the primary pressure indicator 43. At atmospheric pressure the element 243 is preferably in the position shown at the time of sealing the same in position by glyptol 218 or the like.

In operation, the vacuum indicator 41 can be connected through suitable valves 84 and 88 to the intake 82 or a vacuum modulated device within the transmission through a connection 85, as explained in connection with FIG. 2. Such vacuum modulated systems have not been illustrated because they vary in different automobiles of different manufacture. However, such vacuum modulated devices usually comprise a diaphragm or the like equipped with a helical spring. The diaphragm is exposed to subatmospheric pressures in the system so that as vacuum develops therein the spring is compressed from the atmospheric side. A rod or the like is used in connection with a spool valve in such manner as to control the discharge of fluid from the spool valve to thereby modify the operation of the throttle control in a manner to control pressures operating certain of the shift mechanisms in the vehicles. The vacuum compressed atmospherically pressure operated diaphragm modifies, or takes the place of, the throttle linkage under certain conditions of operation for performing desirable functions. As pointed out in connection with the above-mentioned application of Lawrence L. Flaugher, certain portions of the test indicative of certain malfunctions are best ascertained by observance of the variations in the vacuum pressure from such vacuum modulated systems and an example thereof was set forth in connection with said application.

*Temperature indicating mechanism*

Referring now to FIGS. 16, 17 and 18, the primary oil temperature indicating mechanism 42 is disclosed. A probe in the form of a flexible tube 260, which may be made of Teflon, for example, or other suitable flexible plastic, terminates in a conducting head 261. The head 261 and tube 260 are inserted into the fill pipe 96 and the tube 60 is of sufficient length to travel through both long and short fill pipes and is of suitable flexibility to pass through sharp turn bends and the like, in such tubes, until the head 261 is bathed in a fluid 262. It is preferred that the tube 260 be of relatively small diameter, for example ¼ of an inch outside diameter, so as to pass freely through the narrowest commonly used fill pipe and bends therein. It is to be understood that the diameter can be even less than ¼ of an inch, if required, to accommodate still tighter bends and smaller fill pipes 96.

The handle 95 is in the form of an elongated cup and is preferably made of a rubber-like material such as neoprene, or other suitable flexible plastic. The handle 95 is adapted to slip over the top of a fill pipe 96 and, accordingly, it is slidably mounted on the tube 260 at a point displaced sufficiently from the sensing head 261 to permit the head to engage the active oil 262 in the sump and not the oil in the fill pipe only, which is relatively inactive. As explained above, there are wires 97 in a two-wire insulated cable 263 within the tube 260. The ends of the wire are in electric circuitry with terminals 264 of a temperature sensitive resistance 267. One wire 97 is soldered at point 265 to a terminal 264. The other wire 97 is soldered at point 265a to the inside of the head 261. The other terminal 264 is soldered to a perforated end of the head by solder 265b. The temperature sensitive resistance may be suitably fitted for frictional fit inside of the heat-conducting tip or head 261 of the probe 42. As shown, the surfaces of contact along a line 268 may be filled with a suitable heat-conducting cement.

The head 261 is preferably in the form of deep drawn cup made from copper or other good heat-conducting material and has a rolled-in depression 269. The end of the tube 260 is spread out or opened up to pass over the sides of the cup 261 in the length 270 continuing on to the end, and the spring-back of the Teflon will cause same to recover in the form of an annular groove 271 to secure the tube to the head 261. A wire, not shown, can be secured over the groove 271 to assure securement of the parts. It is preferred that the ends of the wires 97 be provided with sufficient slack to be flexible so as not to interfere with flexing of the end 271 of the tube 260.

The temperature sensitive resistance may be any of several commercially available but preferably is in the form of a small pellet provided with terminals 264 and 265 for soldering to the lead wires 97. The resistance which will then vary with temperature is preferably connected in a conventional Wheatstone bridge circuit as one leg thereof to drive a galvanometer for positioning a pen or for positioning an indicator to indicate the oil temperature at all times during a test operation.

FIG. 18a shows a modification of the head. The tube 260 end 271 is stretched over a head 261a to frictionally secure the same. The temperature sensitive wafer 267 is friction-fitted in a hole 261b in a web 261c on the internal end of the head 261a to receive or dissipate heat therethrough. The terminals 264 have solder joints 265c with the wires 97. Heat shrinkable plastic insulating sleeves 97a and an insulating paper U-dip 97b prevent short circuiting of temperature sensitive resistance 267.

The handle 95 has a relatively deep pocket 273 therein having in-turned angled ends 274 which can be stretched as indicated in FIG. 16 to frictionally engage the exterior at the top end of a fill pipe to prevent transmission oil from being spewed out upon engine parts. When the handle is withdrawn, the angled edge 274 will cause any oil that may be trapped between the edge 274 and the exterior of the fill pipe 96 to drain back to the interior of the fill pipe as the end retracts to the position shown in FIG. 17. As disclosed briefly above, the tube 260 is slip-fitted frictionally on a surface 275 and can be slipped on the tube 260 to provide for the sealing function for fill pipes of different lengths while still placing the sensitive head 261 into the active oil in the sump of the transmission. A convenient gauge for positioning the handle 95 before insertion thereof is the transmission dip-stick, not shown.

In operation of the indicating mechanism, the head is inserted through the fill pipe 96 to substantially the position shown. The flexibility of the tube is preferably such as to follow short radius and serpentine curvatures and the like common in many vehicles to place the head sufficiently into the sump so that the thermistor is at all times bathed with active oil, i.e., not fill pipe oil. The wires 97 are impressed with current in a suitable Wheatstone-bridge circuit, not shown, or the like, to operate a galvanometer driven pen or the like to give an indication or recording of temperature of the oil in the sump of a transmission at all times. As mentioned above, and as mentioned more specifically in the above-mentioned patent application, the temperature of the oil in the automatic transmission is indicative in many makes of transmissions of certain malfunctions which are difficult of detection. Such functions, however, are particularly conducive to creating excessive oil temperatures and the oil temperature indication mechanism comprises an important feature of this invention.

*Recorder*

Referring now to FIGS. 19 through 21a, the recording mechanism is shown. The recorder 36 is mounted on a base plate 280 and has a pair of end plates 281 and 282. Crossbars 283 and 284 are suitably secured between the end plates 281 and 282. A strip chart 285 is delivered from a roll 286 mounted for rotation upon a journal 288 which provides a low degree of friction to place a slight tension on the chart 285. The chart 285 is drawn across a plate 290 having a sharply defined edge 291 at the top thereof over which the chart 285 is pulled and at which point the chart is marked by a stylii 292 to be described more in detail hereinbelow. The chart passes between a power-driven roll 294 against which it is pressed by a suitably biased roll 295 on the opposite side of the chart. The roll 294 is suitably friction driven by a motor 297 through gears or sprockets and a chain 298, or the like. The chart 285 is delivered into a space 300 into which it falls in pleats after passing between the rolls 294 and 295. An access door 301 is provided in a suitable cover, not shown, which door can be raised so that the chart can be withdrawn and torn off over the lower edge of the cross-bar 284.

The stylii 292 are driven by galvanometers 305, there being five such galvanometers indicated in FIG. 20. Galvanometer 305a can respond to vehicle speed, galvanometer 305b can respond to engine r.p.m., galvanometer 305c can respond to primary oil pressure in the automatic transmission, galvanometer 305d can respond to vacuum pressure in a vacuum modulated transmission and galvanometer 305e can respond to temperature of the primary oil. It is to be understood that more less than five galvanometers, or the like, can be used. It is desired to utter and utilize indications of functions of transmissions and mechanisms associated therewith. As will be explained more in detail hereinbelow, pressure controlled and operated marking devices can also be utilized in co-operation with galvanometer-type devices, or the like, for also utilizing records or different applications of the present invention.

The chart 285 is suitably co-ordinated or lined to display signals responsive to time related conditions; and such lines 306 are suitably spaced so as to represent seconds, for example. As a specific example, and not in a limiting sense, the lines can be spaced to represent one or two second intervals but are preferably sufficiently spaced so that readings of transmission operation requiring only a few hundredths of a second will be ascertainable for the purpose of disclosing characteristics of operation of certain transmissions.

Inasmuch as the stylii 292 are identical, only one 292a will be described in detail. The galvanometer 305a driven in response to vehicle speed may be fed from a pair of lead wires 63, FIG. 2, through a cable 38 for all of the lead wires controlling the recording device 36. The wires 63 may terminate in jacks 307 of which there are enough provided to accommodate wires for other functions such as engine speed, oil pressure, vacuum pressure and temperature, and also the wires 101 that can short the temperature responsive galvanometer 305e to create pips 308 on the chart 285 on the temperature curve 309, which pips 308 define the beginning or end of a step or portion of the test program. There are 14 lead wires with corresponding jacks 307 shown in FIG. 20 which corresponds to the number of lead wires indicated in FIG. 2 for providing suitable connections for all of the equipment described therein.

The engine r.p.m. may be supplied through lead wires 59 further connected with jacks 307 for transferring signals responsive to spark pulses generated in the pulse generator 54, FIG. 2. All of the jacks 307 can be suitably secured to a J-shaped bracket 310 provided with sponge rubber, not shown, or the like, within the bight of the J-hook for conveniently mounting same over the edge of the car window, not shown, to provide a convenient means of bringing the signals into the passenger compartment of the car. Accordingly, only the cable 38 need be exposed and transfer all signals to the recorder 36. It is anticipated that the recorder 36 will be placed in an office at a position somewhat remote from the position of actual test of vehicles, whereby office personnel may conveniently handle the records concerning a test while the mechanics working on the vehicles can perform their portions of a test with neither party being disturbed by the other.

As pointed out more in detail in the above-mentioned application of Lawrence L. Flaugher, there are two significant characteristic attributes of a transmission that render intelligence signal for making ascertainment of many characteristics of most conventional automatic transmissions. These two conditions comprise the hydraulic pressure of the primary fluid of the automatic transmission and the differential r.p.m. of the engine with respect to the drive shaft of the vehicle. In the above-identified application, an electromechanical device for adding or integrating the engine r.p.m. and the vehicle speed was disclosed. In the above-mentioned application, there is shown a convenient mechanism for electrically integrating control signals issued by the mechanism described above in connection with the spark pulse signal generator 54, FIG. 2, and the drive shaft r.p.m. indicator 44, that can be used with discriminating circuits to be described hereinbelow in connection with FIG. 20a.

FIG. 20a shows an engine r.p.m. indicator 312 and a miles per hour indicator 313 connected through terminals x and y, and x' and y', respectively, to legs b–c and b–d of a Wheatstone-bridge circuit 315. Legs Z1 and Z2 comprise the other legs of the bridge and a galvanometer 305f can drive a pen 292f in response to the resultant of both signals generated in the amplifiers 312 and 313. Terminals a and b of the bridge circuit 315 are connected across a source of a potential, such as a battery, for example. It is preferred that the potentiometer 305f be so arranged between terminals x and y, and x' and y' that the signals appearing across terminals c and d of the bridge circuit 315 are normally in opposition to each other whereby to minimize travel of the stylus 292f driven by the galvanometer 305f. It is to be understood that other balancing type circuits, or the like, could further be utilized in known manner for accomplishing substantially the same function. However, a particular advantage of the circuitry disclosed is that the galvanometer 305f responds instantaneously with a minimum of inertia lag to variations in the input signals from both the r.p.m. indicator 312 and the miles per hour indicator 313.

Referring to FIG. 21, each of the galvanometers 305 comprises a magnet 316, having spaced apart upwardly facing north and south poles 317 and 318. The coil 319 of the galvanometer is suitably attached to a pivoted post 320 in bearings, not shown, to provide for rotary motion of the stylus 292a to the left or right as viewed in FIG. 21. The post 320 has a transverse hole therethrough into which a bayonet 322 can be inserted and a set screw 323 turned down to secure the same substantially in the position shown in the drawing. The bayonet 322 is connected with an insulating cross plate 324 to which wires 325 and 326 can be secured. The wires 325 and 326 are preferably very flexible and conduct current in a manner to be described below in connection with FIG. 21a for heating an element in the stylus 292a. A flexible electrical conducting strip 328 is also secured to the cross plate 324 and at its distal end is soldered to a heat conducting channel or tube 330. The tension in the strip 328 is sufficient to put a nominal pressure downward adjacent the edge 291 upon the chart 285 as it passes onto the plate 290. As is well known in the art, as a different amount of current appears in the winding 319 of the galvanometer 305a, the stylii 292a will be driven thereby to different positions against the tension of a spring, not shown.

Referring now to FIG. 21a, the details of construction of the stylus 292a is shown. The flexible strip 328 has down-turned distal edges 331 secured as by solder 332 to the heat conducting tube 330. The tube 330 at its end 333 is welded to a nickel-chromium wire 334 such as Nichrome, for example. Suitable heat conducting electric insulation 335 is retained within the tube 330 exteriorly of the Nichrome wire 335. The other end of the Nichrome wire is welded to a copper wire 326a which may be provided with insulation 326b, and in turn connected with the wire 326 to complete a circuit through the Nichrome wire 335. The other side of the circuit is completed through the conducting strip 328 to which the wire 325 is secured, not shown. A suitable controlled potentiometer, not shown, connected to a battery or the like, can place sufficient current across the Nichrome element 335 to heat same to such extent that the conducting tube 330 is heated sufficiently to mark heat sensitive chart paper 285. Such paper is well known in the recording art and will not be described.

To enable others to practice this portion of the invention conveniently, a conducting thin walled tube 330 used was approximately 2½ inches long and approximately 47 thousandths of an inch in outside diameter. The Nichrome wire 335 can vary favorably between ¾ of an inch in length and be of substantially only a few thousandths of an inch in thickness. The Nichrome wire can further be very thinly coated with a high temperature electrical insulating cement 335f only a few thousandths of an inch in thickness and such insulation can also be applied to the exposed wire 326a beyond the insulation 326b. The distal end of the Nichrome wire 334 is cleaned of the cement and welded to the conducting member 330 at its end 333. The flexible strip 328 is preferably approximately ten thousandths of an inch brass shim stock and is approximately two inches long before being shaped to provide a connection to the wire 325 substantially as shown in FIG. 21. Such stylus has a very low inertia and responds substantially instantaneously to bias of the galvanometer and, accordingly, the heat markings are accurate.

Referring now to FIGS. 22 through 24, a modification of the recorder is shown. Referring first to FIG. 22, a conventional recorder 340 having a chart 341 delivered from a feed roll through substantially fixed speed driving rolls, not shown, passes over a plate 342 whereupon it is marked by conventional pens 343, carried at the ends of marking devices similar to those described above but being provided with ink in known manner. Of course, the pen retaining members 345 are not heated but flexible members 346 supporting same may be similar to the spring brass members 328 disclosed above. The chart 341 is lined for uttering charts with respect to time, and the lines are preferably spaced to represent a second or two. The chart is moved along at sufficient speed to render indications in small fractions of a second. The left-hand strip of the chart 347 may represent temperature, the adjacent portion 348 may represent vehicle speed, the central portion 349 may represent engine r.p.m., the next adjacent portion 350 represents primary oil pressure and the right-hand portion 351 may represent vacuum pressure. As pointed out above, it is also desirable in some cases to combine the outputs of the vehicle speed and engine r.p.m. to utter only a composite signal as the difference of the two. In such cases, the circuitry disclosed in FIG. 20a can be used if desired. The pens 343 are driven by galvanometers 305g, being substantially identical to those disclosed hereinabove.

The device disclosed in FIG. 22, differs additionally over that disclosed above in comprising a helical Bourdon tube 355 driven through oil pressure tube 356 which can be connected directly to the automatic transmission, not shown. The vacuum pressure portion of the chart 351 is marked by a pen driven by a bellows assembly 357 connected with a tube 358 connected to the vacuum system of the vehicle, not shown.

The recording device of FIG. 22 is desired for use in smaller automobile repair shops where the same can be mounted conveniently close to a vehicle being tested for making a record of transmission performance thereof. The tubes 356 and 358 are preferably connected only at short distances from the vehicle and, hence, are more limited in their application than the recording mechanism described hereinabove. However, as properly applied adjacent a vehicle being tested, accurate and quick tests can be performed with the recording mechanism 340 and the record is substantially identical to that produced by the mechanism described in connection with FIGS. 20 through 21a. The chart 341 marked in accordance with conditions controlling the potentiometer 305g and the Bourdon tube 355 and the bellows 357 is substantially identical and subject to comparison with identical norms for ascertainment of characteristics of performance of a transmission of a vehicle.

FIG. 23 shows the Bourdon tube 355 adapted to operate from atmospheric pressure up to several hundred pounds per square inch. The tube 355 is coiled in helical coils 360 and the left-hand end thereof 361 is suitably connected to a bracket 362 that in turn is mounted on a panel 363 forming a wall of the housing 340 of the recorder. The distal end 365 of the coil 360 is provided with an adjustable clip 366 which in turn carries a post 367 mounting a bracket 368 to which an arm 369 is secured for driving the pen 343 at its upper end. Changes in oil pressure present in the tube 356 in communication with the inside of the coils 360 will cause the same to wrap and unwrap to rotate the pen 343 to the right or left as viewed in FIG. 22.

Referring now to FIG. 24, the vacuum indicating device is shown. A bracket 370 may be secured to the panel 363 in the recorder 340 and supports a base plate 371 in turn supporting a flexible bellows 372. The bellows may inherently have a desirable spring rate for operating in the vacuum range of pressures, or may include an adjustment spring, not shown, for compensating the inherent spring rate of the bellows whereby to render same properly operative in the vacuum or sub-atmospheric range of pressures. The bellows is connected for communication through a tube 358 to the vacuum side of a vacuum modulated system of certain transmissions. The pressure variations between atmospheric and the pressure within the bellows 372 will cause raising and lowering of a drive stem 373 for positioning an arm 374 to cause rotation of an arm 375 around an adjustment pivot 376. The arm 375 carries a bracket 377 which, in turn, is connected with an arm 378 driving the pen 343 to cause vacuum pressure markings on the portion 351 of the chart 341.

Signal circuits

Referring now to FIGS. 25 and 25a, the amplifiers cooperable with the engine r.p.m. signal generator 40 and the vehicle speed signal generator 44 are disclosed. As mentioned hereinabove, the recording instruments can be operated either by automobile battery power or by suitably transformed and rectified alternating current available in garages or the like. The switch 106 is indicated diagrammatically as being connected with the linkage 111 for operating changeover switches 380 and 381 for powering the amplifier circuits either from the automobile battery 37 or a suitable transformer rectifier 382 connected to a suitable source of alternating current 383. As will appear more fully below, the output through wires 384 and 385 is preferably a constant 9.5 volts D.C. With the switching linkage 111 in the position shown, contacts 386, 387 and 388, 389 are bridged by conductors 381 and 380 respectively whereby the battery 37 is energizing the circuitry to be explained below. With the switch 106 moved upwardly, contacts 390, 391 and 392, 393 will be bridged respectively by conductors 381 and 394 to energize the circuitry from the power source 382.

The miles per hour (m.p.h.) output coupling and indicating circuit 450 includes a monostable multivibrator which is caused to shift states and provide output pulses in response to the closure of a switch; the switch closes a number of times during a given time period depending on the miles per hour indication of the transmission being tested. The multivibrator provides output pulses of a set amplitude and given width and these pulses are integrated in an output capacitor connected across a galvanometer coil. As mentioned above in connection with FIGS. 8 and 9, the higher the speed at which the driveshaft connected to the transmission being tested is running, the more output pulses will be provided per given time period and hence a higher output voltage will be developed across the output capacitor to cause a higher reading on the galvanometer.

The details of the circuit 450 are as follows: The monostable multivibrator or flip-flop circuit 410 comprises a pair of PNP type transistors 411 and 412 each having base, emitter and collector electrodes. The emitter of transistor 411 is connected directly to the emitter of transistor 412. The collector of transistor 411 is connected through a pair of parallel connected capacitors 413 and 414 to the base of the transistor 412. The collector of transistor 412 is connected through a resistor 416 to the base of a transistor 411; a capacitor 415 is connected in parallel with resistor 416. Series connected resistors 417 and 424 are connected from the collector to the base of transistor 412; a pulse smoothing capacitor 419 is connected in parallel with resistor 417. Capacitors 413, 414 and 415 and resistor 416 essentially determine the time constant of the flip-flop circuit 410. In one embodiment, capacitors 413 and 414 are .47 microfarad, capacitor 415 is .400 microfarad, and resistor 416 is 1.8K ohms in rating. These circuit component values provide output pulses having a width of about ten milliseconds as will be discussed hereinbelow.

The emitter of transistor 411 is connected through a resistor 431 to the positive terminal of a source of electrical potential 37, which may be a battery or a rectified alternating current signal as discussed hereinabove. A capacitor 432 is connected in parallel with resistor 431. The resistor 431 establishes the emitter bias for transistor 411 and capacitor 432 protects against temporary overload conditions. The base of transistor 411 is connected through a resistor 433 to a positive terminal of source 37; the resistor 433 establishes the base bias for transistor 411. The base of transistor 411 is also connected through a capacitor 440 to one terminal of a switch 435; the other terminal of switch 435 is connected to the negative terminal of source 37. The capacitor 440 provides D.C. isolation to the base of transistor 411. Switch 435 has the characteristic that it momentarily closes for one millsecond from 0 to 45 times each second, for example, depending upon the m.p.h. of the transmission being tested.

A capacitor 436 and a Zener diode 437 are connected across source 37. The Zener diode 437 has its cathode connected to the positive terminal of source 37 and its anode connected to the negative terminal of source 37 and functions as a low voltage regulator and should be temperature stable i.e., it should have a relatively constant temperature coefficient. The capacitor 436 functions as a noise filter. A regulated voltage supply is thus provided for the flip-flop circuit 410. A resistor 438 is also connected from a positive terminal of source 37 to one of the terminals of switch 435, and a resistor 434 has one terminal connected to the positive terminal of source 37 and its other terminal connected to the cathode of diode 437.

The output signal from the flip-flop 410 is taken from the collector of transistor 411 across a resistor 418 and is coupled through a resistor 420 to the base of a transistor 421. Resistor 418 has one terminal connected to the collector of transistor 411 and its other terminal connected to the negative terminal of source 37. Transistor 421 has its emitter connected to the negative terminal of source 37. The collector of transistor 421 is connected through the resistor 422 to the base of a transistor 425 and is also connected through a resistor 426 to the positive terminal of source 37. The emitter of transistor 425 is connected to the positive terminal of source 37. The collector of transistor 425 is connected to one terminal of the load which comprises a capacitor 428 connected in parallel with the coil (18 ohms) of a galvanometer 305a. The other terminal of capacitor 428 is connected to the negative terminal of source 37.

It is necessary that the power supply voltage be regulated rather closely in order that the height of the output pulses provided by the flip-flop circuit 410 be of a constant amplitude. As is known, since the output capacitor 428 is integrating (summing), the energy in a number of pulses during a given time period it is necessary that the pulses all have the same energy "content" in order that the output capacitor accurately provide an output voltage corresponding to the number of pulses received during a given time period.

The operation of the circuit is as follows: Transistor 411 is normally in its nonconducting state or OFF and transistor 412 is in its conducting state or ON. Transistor 421 is normally ON and transistor 425 is normally OFF. When the switch 435 closes momentarily, transistor 411 will turn ON since a negative potential will be coupled to its base. When transistor 411 turns ON, transistor 412 will be turned OFF as is well known in flip-flop operation. When transistor 411 turns OFF, a signal of approximately 6 volts will be produced across the resistor 418 and this signal will be coupled through resistor 420 to the base of transistor 421 to turn transistor 421 OFF. When transistor 421 turns OFF, a negative voltage will be provided to the base of transistor 425 turning transistor 425 ON. When transistor 425 turns ON a positive pulse will be applied to the output capacitor 428.

Transistor 411 will remain ON for a time corresponding to the RC time constant determined by capacitors 413, 414 and 415 and resistor 416. As stated above, in one embodiment, these circuit components are selected to cause flip-flop circuit 410 to provide a ten milliseconds pulse. As is known, by the end of ten milliseconds the capacitors 413, 414 and 419 will have charged sufficiently to cause the base of transistor 412 to become sufficiently negative, thus turning transistor 412 ON and causing transistor 411 to turn OFF; this, in turn, causes transistor 421 to turn ON and transistor 425 to turn OFF thus terminating the output pulse. The output capacitor 428 will integrate the output pulses, consequently, the voltage developed across capacitor 428 will be determined by the number of pulses that are coupled to it and hence will be determined by the number of times the switch 435 closes during each given time period; this in turn is determined by the speed (m.p.h.) at which the output shaft connected to the transmission being tested is running. In summary, the voltage developed across output capacitor 428 and hence the reading on galvanometer 305a will be a measure of the m.p.h. rate of the vehicle.

The revolutions per minute (r.p.m.) coupling and indicating circuit 460 is substantially identical to the m.p.h. coupling circuit with the exception that in the r.p.m. coupling circuit 450 a variable resistance element 441 is employed instead of the switch 435. The variable resistance element 441 is indicated schematically in FIG. 25 and the details thereof are shown in FIG. 25a. In operation, two identical circuits, one with the switch 435 and one with the variable resistance element are used to determine m.p.h. and r.p.m.; conversely, the switch 435 and element 441 could be employed (switched in) alternatively in the same circuit. The variable resistance element 441 comprises a photocell 180 connected to terminals P and Q of the circuit of FIG. 25. The photocell 180 is arranged to receive light rays from a neon lamp 157. The neon lamp 157 is connected to the ignition lead 158 and 159 (FIG. 4) of a spark plug of the transmission being tested as shown in FIG. 4 and the neon lamp 157 is caused to light up or shine each time the spark plug ignites. When the spark plug is between ignition cycles, the neon lamp is dark and the photocell 180 is at a high resistance value of about 10 megohms. When the neon lamp 157 lights up and shines on the photocell 180, it decreases the resistance of the photocell 180 (as is well known in the art) from 10 megohms to 100,000 ohms.

The decrease in the resistance of element 441 functions in a similar manner as does the closing of switch 435, to cause the flip-flop circuit 410 to shift conducting states to thereby provide an output pulse. The number of pulses is indicative of the r.p.m. of the transmission being tested and thus the voltage developed across capacitor 28 and the reading on a galvanometer 305b will thus be indicative of the r.p.m. of the transmission.

It is to be noted that the vehicle speed output signal across points x and y, FIG. 25, and the engine r.p.m. output signal across points x' and y', can be impressed upon the legs of the bridge 315, FIG. 20a, to drive the galvanometer 305f conjointly.

*Inertia system*

Referring now to FIGS. 26 and 27, an inertia device for simulating road conditions is shown in the form of a test stand 475 hereinabove indicated diagrammatically in FIG. 3. The test stand 475 is built upon a base frame having rear and forward channels 488 and 477 connected by end channels 490 and 491. A forward roll 492 is suitably journaled in bearings 493 and 494 and through a flexible coupling 495 drives a shaft 496 secured to a sheave 498. A rear roll 500 is suitably journaled in bearings 501 and 502 and turns a shaft 503 which may drive a suitably mounted generator type transducer 505 which will generate signals indicative of the speed of the wheel, i.e., vehicle speed. The circuitry for such vehicle speed is connected through wires 114 leading to a recorder and wires 119 leading to a miles per hour indicator in a panel 122.

The frame channel 491 is connected to a parallel channel 507 by a rear end channel 508 and an extension 509 of the front channel 488. A pivot shaft 510 is suitably journaled in bearings 511 and 512 in the side channels 507 and 491, respectively. Secured to the shaft 510 are a pair of rotatable brackets 515 and 516 mounting pillow blocks 518 and 519, respectively, providing bearing points for an interconnected shaft 520. The shaft 520 is preferably welded to a massive disk 522, and is also secured to a drive sheave 523. An internal V-belt 525 is trained over the sheaves 498 and 523 to turn the shaft 520 and, hence, the massive disk 522. A less massive disk 527 is mounted on the shaft 520 on a suitable bearing, not shown. The disk 527 can be secured to the massive disk 522 for rotation therewith by means of shouldered bolts 529, there being four shown in FIG. 27.

As clearly indicated in FIG. 27, the weight of the disks 522 and 527 will act downwardly to tend to rotate the brackets 515 and 516 clockwise upon the pivot 510 to place tension on the belt 525. Thus, good driving friction is assured between the belt 525 and the sheaves 498 and 523. A brake shoe 530 is mounted on a link 531 and can be rotated by a lever 533 which pivots around a pivot 534 to rock a crank 535 to drive a link 536 pivotally connected between the distal end of the crank drive 535 and the lowermost end of the link 531 to move the shoe 530 to and from engagement with the exterior of the belt 525. Other suitable brake linkages can be used and the purpose of the device is primarily to prevent rotation of the roll 492 when a vehicle is being driven on and off of the test stand. The test stand 475 can further be provided with suitable ramps 540, or placed in a well in the floor as desired.

It has been found that to suitably simulate road conditions the massive disks 522 and 527 need not be very large. For average usage on inertia of substantially ten slugs per foot per foot has proven satisfactory. For example, it has been found that the massive disk 522 may be on the order of 400-pounds, for example, and the auxiliary disk may be substantially one-third of that weight. The massive disk 522 will then absorb over 50% of the inertia of the average popular vehicle and over one-third of the inertia of a heavy popular passenger vehicle. Of course, lighter vehicles will approach nearly 100% with such mass in the inertia device 475. The mechanism will normally be operated with the bolts 529 removed so that the massive wheel 522 only is utilized. Such will accommodate substantially 90% of the vehicles ordinarily tested. Where occasion demands a greater inertia, the bolts 529 can be placed to connect the disks 522 and 527 whereby to provide more suitable characteristics for heavy vehicles and light trucks, and the like.

In the present device, the inertia of the rolls 492 and 500 are also a factor in the total inertia of the system. The vehicle wheels 542 will drive the rolls under acceleration to in turn (through the shaft 496 and the sheaves 498, belt 525 and sheave 523, through the shaft 520) drive the massive inertia disk 522. The inertia will simulate in substantial part the inertia of the vehicle when it is operating upon a highway and energy will be stored in the massive moving parts of the test stand during acceleration. Upon deceleration of the wheels 542, this inertia can be returned through the above traced power path, and the roll 492 will drive the wheels 542 to thereby simulate deceleration characteristics like road operation conditions.

The shafts 496 and 503 have extended ends 545 and 546, respectively, to which may be secured a dynamometer, or the like, if desired, when it is desired to run a long time test in which energy is absorbed and dissipated. The massive inertia device 475 dissipates only a small amount of energy and, accordingly, accurately simulates road conditions. However, if it is desired to test a transmission such as might be called upon to operate in mountainous country, or the like, it is often desirable to use a conventional energy dissipating dynamometer which may attach to the shaft ends 545 and 546 as well as the device 475.

Referring now to FIG. 28, a pair of rolls 550 and 551 are suitably mounted on shafts 552 and 553, respectively. A suitable pair of belts 555 are trained over the rolls 550 and 551. Such belts will contact tires 556 mounted on the drive wheels of a vehicle being tested. With such structure, the area of engagement 558 of the tire with the belt is increased over the area of engagement of a tire with either of rolls 492 or 500, FIG. 26 and, accordingly, more power can be transmitted through the shafts 552 and 553. In addition to this, there will be less flexing of the tire 556 and, accordingly, such arrangement may be preferable when the test mechanism is adapted for driving a conventional dynamometer.

While we have shown and described a presently preferred embodiment of the invention, it will be obvious to those skilled in the art that many modifications and alterations of details could be resorted to within keeping of the teachings hereinabove. Accordingly, we desire not to be limited in our invention only to the specific embodiment shown and described but by the spirit and scope of the following claims.

We claim:

1. An apparatus for testing and indicating the speed or revolutions per minute at which an engine having distributor means and spark plugs is operating, said apparatus comprising, in combination:
   (a) a light emitting tube or lamp arranged to provide light pulses in response to electrical pulses;
   (b) said tube being electrically connected to said distributor means and an associated spark plug;
   (c) means connectable to said distributor means for coupling electrical pulses developed by said distributor means to said light emitting tube and to said associated spark plug, said tube being connected to couple an electrical pulse to said associated spark plug and to concurrently emit a light pulse each time said distributor means provides an electrical pulse thereto;
   (d) a photocell positioned to be energized in response to light pulses emitted by said tube;
   (e) an electrical output circuitry responsive to the energization of said photocell for developing a signal which is a function of the number of said light pulses and is indicative of the speed of said engine; and
   (f) said apparatus being connectable to the engine to test and indicate the speed thereof without affecting the normal operation of said distributor means and said associated spark plug.

2. An apparatus as in claim 1 wherein said tube is electrically connected in series between said distributor means and said associated spark plug.

3. An apparatus as in claim 2 further including an electrical circuit including impedance means connected in series with said distributor means and said tube, and in parallel with said spark plug whereby said apparatus remains operable even though the associated spark plug is functioning improperly.

4. An apparatus as in claim 3 wherein said electrical circuit comprises resistor and capacitor components connected in parallel with one another to have a common input terminal and a common output terminal, said input terminal being connected to said tube and said output terminal being connected to grounding means.

5. An apparatus as in claim 1 wherein said electrical output circuitry further includes:
   (a) a monostable multivibrator being electrically connectable to said photocell and being activatable to shift conducting states in response to the energization of said photocell by the light pulses from said tube to provide electrical output pulses of a selected width;
   (b) the number of said output pulses provided by said multivibrator per given time period being dependent on the number of times said photocell is energized during a given time period; and
   (c) capacitive means connected to receive and sum said output pulses and thereby provide an indication of the speed of said engine.

6. An apparatus as in claim 5 further including means for providing a visual display of the speed of said engine.

References Cited by the Examiner
UNITED STATES PATENTS

| | | | |
|---|---|---|---|
| 880,074 | 2/1908 | Haagn | 73—362 |
| 2,065,426 | 12/1936 | Campbell | 324—70 |
| 2,474,312 | 6/1949 | Halpern | 346—139 |
| 2,664,335 | 12/1953 | Gorham | 346—139 |
| 2,805,113 | 9/1957 | Brown et al. | 346—49 |
| 2,825,048 | 2/1958 | Jaynes | 324—70 X |
| 2,912,863 | 11/1959 | Naybor | 73—398 |
| 2,929,023 | 3/1960 | Mishcon et al. | 324—70 |
| 3,004,818 | 10/1961 | Delfs et al. | 346—49 |
| 3,068,700 | 12/1962 | Bourns | 73—398 |
| 3,090,005 | 5/1963 | McConnell | 324—70 |
| 3,104,550 | 9/1963 | Weisheit | 73—362 |
| 3,134,943 | 5/1964 | Evenson | 324—70 |
| 3,157,047 | 11/1964 | Urban et al. | 73—116 |
| 3,178,927 | 4/1965 | MacMillan | 73—2 |
| 3,198,981 | 8/1965 | Du Bois | 312—84.5 |
| 3,205,434 | 9/1965 | Fortune | 324—18 |

OTHER REFERENCES

Automatic Transmissions, by Commercial Trades Institute, Chicago, McGraw-Hill Book Co., Inc., 1955, pages 137, 141, and 230. TL 260 C5.

Crouse, W. H., *Automatic Transmissions and Power Trains*, 2nd ed., N.Y. McGraw-Hill Book Co., Inc., 1959, page 455. TL 260 C7.

RICHARD C. QUEISSER, *Primary Examiner.*

J. W. MYRACLE, *Assistant Examiner.*